US012590888B2

(12) United States Patent
Maki et al.

(10) Patent No.: US 12,590,888 B2
(45) Date of Patent: Mar. 31, 2026

(54) INFRARED ANALYSIS CHIP, AND INFRARED IMAGING DEVICE

(71) Applicant: KEIO UNIVERSITY, Tokyo (JP)

(72) Inventors: Hideyuki Maki, Kanagawa (JP); Yusuke Fukazawa, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 164 days.

(21) Appl. No.: 18/298,619

(22) Filed: Apr. 11, 2023

(65) Prior Publication Data

US 2023/0251188 A1      Aug. 10, 2023

Related U.S. Application Data

(62) Division of application No. 16/980,504, filed as application No. PCT/JP2019/009025 on Mar. 7, 2019, now Pat. No. 11,656,173.

(30) Foreign Application Priority Data

Jul. 6, 2018    (JP) ................................. 2018-072742
Jul. 6, 2018    (JP) ................................. 2018-129537

(51) Int. Cl.
G01N 21/35        (2014.01)
G01N 21/55        (2014.01)
G01N 21/59        (2006.01)

(52) U.S. Cl.
CPC ............. *G01N 21/35* (2013.01); *G01N 21/55* (2013.01); *G01N 21/59* (2013.01); *G01N 2201/061* (2013.01)

(58) Field of Classification Search
None
See application file for complete search history.

(56) References Cited

U.S. PATENT DOCUMENTS 5,251,008 A      10/1993  Masutani
6,285,811 B1 *    9/2001  Aggarwal .............. G01Q 60/22
                                                            250/206

(Continued)

FOREIGN PATENT DOCUMENTS

EP            1645865          4/2006
JP          H05-079915         3/1993

(Continued)

OTHER PUBLICATIONS

Office Action mailed on Sep. 19, 2023 with regard to the corresponding Japanese patent application No. 2020-506444.

(Continued)

*Primary Examiner* — Marcus H Taningco
(74) *Attorney, Agent, or Firm* — IPUSA, PLLC

(57) ABSTRACT

A configuration of a time and space-resolved infrared spectroscopic analysis which can be integrated onto a chip is provided. An infrared analysis chip includes a substrate in which a microchannel is formed, at least one of a spectroscope and a photodetector integrated onto a first surface of the substrate in an area where the microchannel is formed, and an infrared light source integrated on a second surface opposite to the first surface of the substrate, the infrared light source being positioned facing said at least one of the photodetector and the spectroscope.

9 Claims, 16 Drawing Sheets

160

(56)     References Cited

U.S. PATENT DOCUMENTS

| | | | | |
|---|---|---|---|---|
| 7,760,364 | B1* | 7/2010 | Zhuang | B82Y 35/00 |
| | | | | 356/237.1 |
| 8,895,997 | B2 | 11/2014 | Maki et al. | |
| 9,643,181 | B1 | 5/2017 | Chang et al. | |
| 2002/0056807 | A1 | 5/2002 | Narita et al. | |
| 2004/0201835 | A1* | 10/2004 | Coates | G01N 21/8507 |
| | | | | 356/73 |
| 2005/0211555 | A1 | 9/2005 | Archibald | |
| 2008/0036356 | A1 | 2/2008 | Ward et al. | |
| 2009/0122317 | A1* | 5/2009 | Ito | G01J 3/0224 |
| | | | | 356/440 |
| 2009/0249521 | A1* | 10/2009 | Dazzi | B82Y 35/00 |
| | | | | 356/51 |
| 2010/0045212 | A1* | 2/2010 | Mancevski | H05B 41/14 |
| | | | | 977/734 |
| 2010/0202925 | A1 | 8/2010 | Sonnleitner | |
| 2010/0241006 | A1 | 9/2010 | Choi et al. | |
| 2010/0279326 | A1 | 11/2010 | Dosmann et al. | |
| 2011/0268341 | A1* | 11/2011 | Boese | G06T 11/006 |
| | | | | 977/950 |
| 2013/0193404 | A1 | 8/2013 | Koppens et al. | |
| 2014/0264030 | A1* | 9/2014 | Lin | G02B 6/136 |
| | | | | 216/2 |
| 2015/0076373 | A1 | 3/2015 | Chow et al. | |
| 2015/0090885 | A1 | 4/2015 | Ichizawa et al. | |
| 2015/0182967 | A1 | 7/2015 | Coursey et al. | |
| 2017/0105663 | A1* | 4/2017 | Dhawan | A61B 5/14546 |
| 2017/0294629 | A1 | 10/2017 | Kim et al. | |
| 2018/0052186 | A1* | 2/2018 | Su | G01N 21/35 |
| 2018/0166605 | A1 | 6/2018 | Nagai | |
| 2019/0120753 | A1 | 4/2019 | Prater et al. | |
| 2019/0123254 | A1 | 4/2019 | Maki et al. | |
| 2019/0128798 | A1 | 5/2019 | Lin | |
| 2019/0242816 | A1* | 8/2019 | Conner | G01N 27/06 |

FOREIGN PATENT DOCUMENTS

| | | |
|---|---|---|
| JP | H06-018421 | 1/1994 |
| JP | 2002-267590 | 9/2002 |
| JP | 2003-207454 | 7/2003 |
| JP | 2005-181296 | 7/2005 |
| JP | 2007-501403 | 1/2007 |
| JP | 2008-140967 | 6/2008 |
| JP | 2008-309495 | 12/2008 |
| JP | 2009-058273 | 3/2009 |
| JP | 2009-139136 | 6/2009 |
| JP | 2009-283303 | 12/2009 |
| JP | 2010-509577 | 3/2010 |
| JP | 2010-214087 | 9/2010 |
| JP | 2013-127953 | 6/2013 |
| JP | 2014-067544 | 4/2014 |
| JP | 2016-095258 | 5/2016 |
| JP | 2017-508630 | 3/2017 |
| JP | 2019-075342 | 5/2019 |
| WO | 2011/135978 | 11/2011 |
| WO | 2013/147038 | 10/2013 |
| WO | 2016/170670 | 10/2016 |

OTHER PUBLICATIONS

T. Mori et al., "An Electrically Driven, Ultrahigh-Speed, on-Chip Light Emitter Based on Carbon Nanotubes", Nano Letters 14 (2014), pp. 3277-3283.

International Search Report mailed on Jun. 4, 2019 with respect to PCT/JP2019/009025.

Office Action mailed on Sep. 16, 2025 issued with respect to the corresponding Japanese Patent Application No. 2024-028082.

Office Action mailed on Feb. 17, 2026 issued with respect to the corresponding Japanese Patent Application No. 2024-028082.

* cited by examiner

20

(A) Applied Voltage: 0 V (B) Applied Voltage: 3.7 V

20 μm

DIRECT MODULATION OF
LUMINOUS INTENSITY

IR SPECTROSCOPIC ANALYSIS OF
ATMOSPHERIC MOLECULES

INFRARED ANALYSIS CHIP, AND INFRARED IMAGING DEVICE

CROSS-REFERENCE TO RELATED APPLICATIONS

This application is a divisional of U.S. patent application Ser. No. 16/980,504 filed Sep. 14, 2020, entitled "INFRARED ANALYSIS SYSTEM, INFRARED ANALYSIS CHIP, AND INFRARED IMAGING DEVICE", which is the National Stage of International Application No. PCT/JP2019/009025 filed on Mar. 7, 2019, which is based on and claims priority to Japanese Patent Application No. 2018-072742 filed on Mar. 16, 2018 and Japanese Patent Application No. 2018-129537 filed on Jul. 6, 2018, which are incorporated herein by reference in their entirety.

TECHNICAL FIELD

The present invention relates to an infrared analysis system, an infrared analysis chip, and an infrared imaging device.

BACKGROUND ART

For spectroscopic measurement in the near-infrared to mid-infrared region, an instrument known as a Fourier transform infrared (FT-IR) spectrometer has been put into practical use. Infrared spectroscopy is widely used from basic research to industrial applications, for structural analysis, identification, qualitative/quantitative analysis of substances in the fields of chemistry, biotechnology, materials, physics, etc. For infrared spectroscopy or measurements of infrared absorption spectra, an infrared light source with a broad wavelength range is required and in general, a macro-sized (millimeter order), low speed (about 100-ms response speed) blackbody radiation source such as a halogen lamp or a ceramic light source is used.

In recent years, in the visible to near-infrared region, time-resolved spectroscopic measurements using a femto-seconds to nanoseconds short-pulse light source has been developed, which allows observation of the moment-to-moment progress of chemical reactions or structural change processes.

Applications to optical technologies using visible light are in progress in biotechnology and medical fields, and sub-micron spatial resolution has been achieved by microspectroscopy using an objective lens or the like. Bioimaging and biochip analysis using fluorescent markers are also performed using visible light. It is desired to achieve time and space-resolved spectroscopy and imaging using infrared light to the similar extent.

On the other hand, a light source using carbon nanotubes (for example, Patent Document 1 and Non-Patent Document 1), as well as a light source using graphene (for example, Patent Document 2), have been proposed.

RELATED ART DOCUMENTS

Patent Documents

Patent Document 1: Japan Patent No. 5747334
Patent Document 1: Japan Patent No. 6155012

Non-Patent Documents

Non-Patent Document 1: T. Mori, Y. Yamauchi, S. Honda, H. Maki, "An electrically-driven, ultra-high-speed, on-chip light emitter based on carbon nanotubes," Nano Letters 14 (2014) 3277.

SUMMARY OF THE INVENTION

Technical Problem to be Solved

Typical light sources used in infrared spectroscopy are large and slow to respond. For this limitation, there are several problems arising, namely, (1) submicron-order spatial resolution cannot be achieved, (2) high-speed, time-resolved measurements cannot be performed, unlike pulse laser measurement, and (3) infrared light sources cannot be integrated onto a chip.

In other words, conventionally used macro-sized light sources for FT-IR spectroscopy have a spatial resolution of only 10 microns or so even in micro-spectroscopy using an objective lens, due to the constraints such as the limitation of geometrical optics or the diffraction limit.

For performing high-speed, time-resolved measurement using infrared light, a step scan method using a high-speed infrared "detector" may be adopted. However, unlike visible light, no "high-speed and high sensitivity" infrared detector exists at present. Giving priority to perform high-speed measurement, the sensitivity will fall, and for performing highly sensitive measurement, a low-speed detector has to be used.

Besides, current infrared analysis is incapable of submicron-order, high-resolution local analysis required in the fields of chemistry, medical care, bioimaging and so on, and for this reason its application to the imaging field is extremely limited. Although various analytical techniques using different principles are combined for a microfluidic analytical chip with microchannels or the like, an infrared light source such as a halogen lamp or a ceramic light source cannot be integrated onto the chip. If bioimaging and biochip analysis could be realized using infrared to the same extent as when using visible light, expensive fluorescent markers would no longer be needed and the applicable scope will be greatly expanded.

One of the objectives of the invention is to provide a configuration and a technique of highly time-resolved and space-resolved infrared analysis system that can be integrated onto a chip.

Technical Solution(s)

In one aspect of the invention, an infrared analysis system includes
  a light source having a nanocarbon material as a luminescent material, and
  a photodetector configured to detect the infrared light emitted from the light source and transmitted through or reflected from a sample,
  wherein the nanocarbon material is provided on a surface of a substrate and configured to output a surface-emitted light.
In another aspect of the invention, an infrared analysis chip has
  a substrate in which a microchannel is formed,
  at least one of a spectroscope or a photodetector integrated onto a first surface of the substrate in an area where the microchannel is formed, and an infrared light source integrated on a second surface opposite to the first surface of the substrate, the infrared light source being positioned facing said at least one of the photodetector and the spectroscope.

As an alternative, an infrared analysis chip may have a light source substrate on which a plurality of light emitting devices are arranged in an array, each of the light emitting devices being configured to emit infrared light, and a plurality of probe substances fixed onto a surface of the light source substrate at positions of the plurality of the light emitting devices, each of the plurality of the probe substances being selectively bound to a specific target substance.

In still another aspect of the invention, an infrared imaging device includes a light source substrate on which a plurality of light emitting devices are arranged in an array, each of the light emitting devices being configured to emit infrared light, and an infrared detector provided facing the light source substrate, wherein a surface of the light source substrate is configured to receive a sample, and wherein operation of the infrared detector is synchronized with a light emission timing of the plurality of the light emitting devices.

As an alternative, an infrared imaging device may include an infrared light source array having a plurality of light source devices, each of the plurality of light source devices being arranged in an array and having a nanocarbon material extending between a pair of electrodes and a gate electrode for applying a gate voltage to the nanocarbon material, a voltage controller that controls the gate voltage, and an infrared detector provided facing the infrared light source array, wherein the voltage controller sweeps a hotspot by changing the gate voltage, a hotspot sweeping direction extending along a length direction of the nanocarbon material.

Advantageous Effect of the Invention

With any one of the configurations or the techniques of the invention, a highly time-resolved and space-resolved infrared analysis system, which can be integrated onto a chip, is achieved.

BEST MODE FOR IMPLEMENTING THE INVENTIONS

In the embodiments, (i) a novel infrared analysis system using a submicron-order electroluminescent material, such as graphene or carbon nanotubes, as an infrared light source is proposed. (ii) Using the near field, infrared analysis with high spatial resolution beyond the diffraction limit is proposed, together with an infrared imaging technique making use of such infrared analysis. (iii) Using a nanocarbon light source whose luminescence intensity can be modulated at high speed (about 100 ps), high-speed time-resolved infrared analysis is achieved based on a new theory. (iv) A microchannel analyzer with minute light emitter elements formed on a microchannel is proposed. (v) Arranging minute infrared light sources such as nanocarbon light sources in a two-dimensional array, a biochip analysis technology based on a new theory of infrared absorption is achieved without using a fluorescent marker. (vi) High-speed infrared imaging is realized using a single infrared detector by two-dimensionally arranging minute infrared light source elements. (vii) By designing an infrared light source element capable of sweeping a hotspot, an infrared light source element with a spatial resolution in one-dimensional direction is achieved. By arranging a plurality of such infrared light source elements, each being capable of sweeping a hotspot, in a direction orthogonal to the sweeping direction, wide area infrared imaging is realized.

Hereinafter, embodiments of the invention will be described in detail.

First Embodiment

In the first embodiment, a nanometer or submicron-sized electroluminescent material including graphene and carbon nanotube is used for an infrared light source, whereby a small, inexpensive, high-speed, and high spatial resolution infrared analysis system is achieved, in place of the conventional infrared analysis (such as FT-IR or the like) using a halogen lamp or a ceramic light source.

Figure 1A:
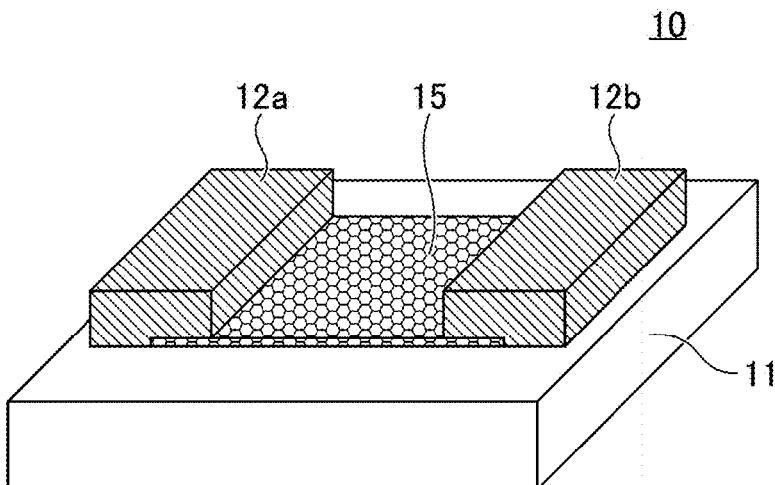
FIG. 1A illustrates, in a perspective view, the basic structure of a nanocarbon light source used in an embodiment.

FIG. 1A illustrates a basic configuration of a nanocarbon light source 10 used in the infrared analysis according to the embodiment. A nanocarbon material 15 is arranged on a substrate 11, and electrodes 12a and 12b are formed at both ends of the nanocarbon material 15. The electrodes 12a and 12b are electrically connected to the nanocarbon material 15 at the ends of the nanocarbon material 15.

The nanocarbon light source 10 has a planar structure in which the nanocarbon material 15 serving as a light emission layer is disposed at the surface. The electrodes 12a and 12b may be partially or entirely embedded in the substrate 11 as long as they are electrically connected to the nanocarbon material 15.

The nanocarbon material 15 can be formed on any substrate, including a silicon substrate and a glass substrate, and accordingly, the substrate 11 may be of any material or type such as a silicon substrate, a glass substrate, a polymer substrate, or the like. The nanocarbon material 15 may be of any type including single-walled carbon nanotubes, multi-walled carbon nanotubes, single-walled graphene, multi-layered graphene, thin graphite, etc. The carbon nanotube may be a single carbon nanotube or a carbon nanotube thin film with a plurality of carbon nanotubes arranged in a sheet. Because the nanocarbon light source 10 emits light upon excitation or energization, the electrical characteristic of the nanocarbon material 15 may be metallic or semiconducting.

The nanocarbon material 15 may be exposed at the surface of the substrate 11 as shown in FIG. 1A, or, alternatively, the surface of the light-emitting device having the nanocarbon material 15 may be covered with a light-transmissive protective film 16. The protection film 16 may be an insulating thin film that is light transmissive with respect to the wavelength used, and may be formed of silicon oxide, alumina, etc.

The nanocarbon light source 10 emits light when the nanocarbon material 15 is electrically heated through the pair of electrodes 12a and 12b. The temperature of the nanocarbon material 15 increases due to resistance heating, and the nanocarbon material 15 emits light by thermal radiation (called blackbody radiation or graybody radiation) along with the temperature increase. The thermal radiation from the nanocarbon light source has an emission spectrum described by the blackbody radiation equation called Planck's law, and a broad emission spectrum is exhibited mainly in the infrared region (including far infrared to near infrared). In addition, the temperature of the nanocarbon material 15 can be raised to a high temperature by supplying a large quantity of electric current or by fabricating a light-emitting device having a suspended structure or a membrane structure using the nanocarbon material 15. In this case, luminescence up to the visible light range can be obtained.

In the embodiment, a new technique of infrared analysis using a nanocarbon light source 10 is realized. In the conventional infrared spectroscopy, a halogen lamp or a ceramic light source is used as the light source, but these light sources are large-sized on the millimeter order and the response speed is as slow as about 100 milliseconds. With such light sources, spatial resolution of 10 μm or less cannot be achieved due to the diffraction limit of infrared light, high-speed measurement cannot be expected, and it is impossible to integrate the light source onto a chip.

In contrast, the nanocarbon light source of the embodiment behaves as a blackbody radiation based infrared light source, and unlike conventional infrared light sources, (i) super-miniaturization up to the nanometer order is achieved, (ii) integration onto any types of substrates including a silicon chip or a glass plate is possible, and (iii) high-speed light emission at a response time of 100 ps is achieved. Using the nanocarbon light source 10, a high-speed, high-spatial-resolution infrared analysis system is realized, and infrared analysis can be developed based on a new principle that cannot be achieved by conventional infrared light sources.

Figure 1B:
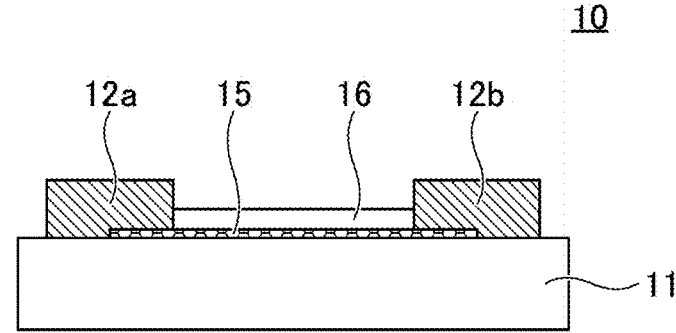
FIG. 1B illustrates a structure with a protection layer provided to the nanocarbon light source of FIG. 1A.
Figure 2:
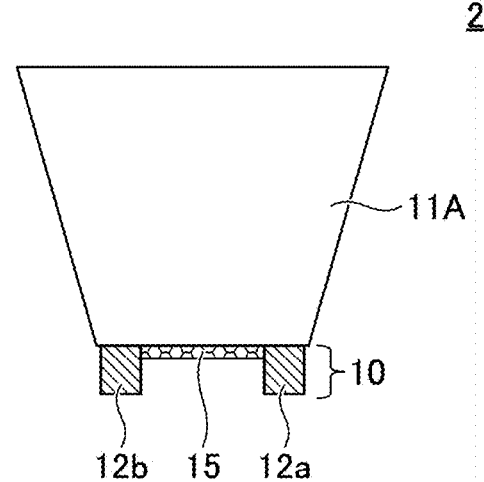
FIG. 2 is a schematic diagram of a probe light source using a nanocarbon light source.

FIG. 2 is a schematic diagram of a probe-type light source 20 using a nanocarbon light source 10. The nanocarbon light source 10 may be formed on a substrate of any shape. A light-emitting device fabricated on a flat substrate 11 illustrated in FIG. 1A or FIG. 1B may be used, or alternatively, a nanocarbon light source 10 (or a nanocarbon light emission device) may be fabricated at the tip of a protruding substrate 11A processed into a probe shape, as illustrated in FIG. 2. Even using a probe-shaped substrate 11A, the tip of the substrate 11A may have a flat area in which the light emission surface of the nanocarbon light source 10 (that is, the arrangement of the extends two-dimensionally. Even when the tip of the substrate 11A is processed into a curved surface, the nanocarbon light source can be fabricated on the curved surface.

Because both the nanocarbon light source formed at the tip of the substrate 11A and the probe-type light source 20 are minute, a sample to be measured can be irradiated by infrared light while the nanocarbon light source 10 is brought very close to the sample.

Figure 3:
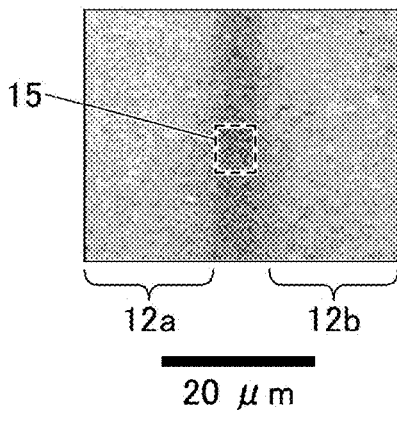
FIG. 3 presents infrared camera images of a fabricated nanocarbon light source.
Figure 3:
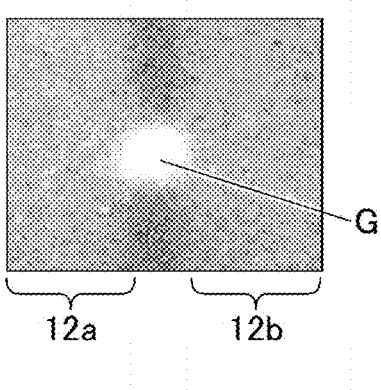

FIG. 3 shows infrared camera images of a nanocarbon light source 10. Graphene is used as the nanocarbon material 15. Image (A) of FIG. 3 shows the device surface where the applied voltage is 0 V, that is, no voltage is applied through the electrodes 12a and 12b. The dark area between the pair of electrodes 12a and 12b is the nanocarbon material 15 of graphene.

Image (B) of FIG. 3 shows light emission under application of a voltage. In this example, a voltage of 3.7 V is applied to the nanocarbon material 15, and it can be seen that the graphene (G) emits light. This luminescence has an infrared wavelength and it can be used as probe light for irradiating the sample to be measured.

Figure 4:
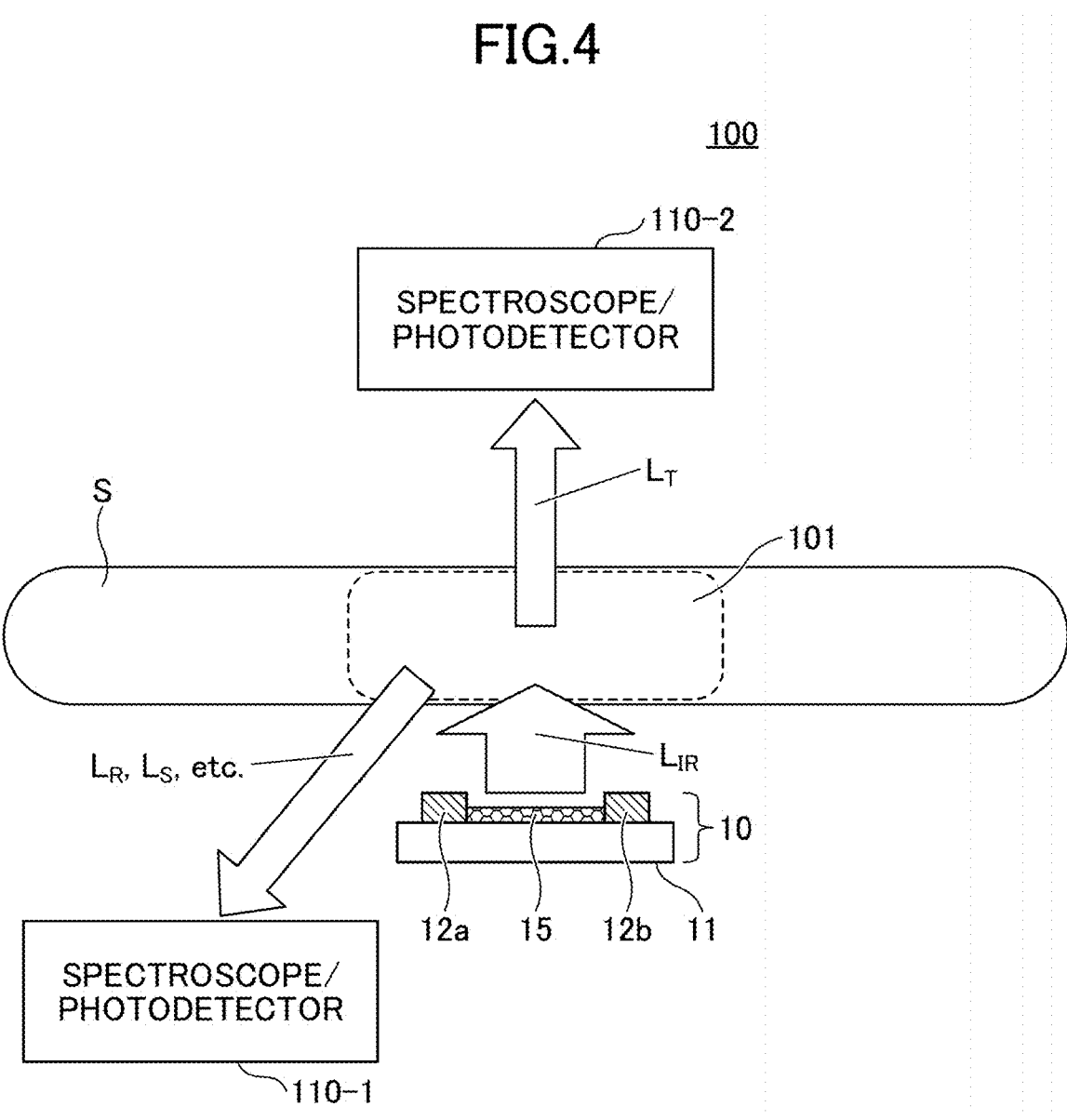
FIG. 4 is a schematic diagram of an infrared analysis system according to the first embodiment.

FIG. 4 is a schematic diagram of an infrared analysis system 100 of the first embodiment. The infrared analysis system 100 has a nanocarbon light source 10 and spectroscopes/photodetectors 110-1 and 110-2. A sample S to be measured is arranged between the nanocarbon light source 10 and the spectroscope/photodetector 110-1 or 110-2. The spectroscope/photodetector 110-1 detects reflected light $L_R$, scattered light $L_S$, or the like from the sample S. The spectroscope/photodetector 110-2 detects transmitted light $L_T$ transmitted through the sample S. The spectroscope/ photodetector 110 does not necessarily have to be arranged on either side of reflection from or transmission through the sample 5, and it may be arranged at only one side.

A predetermined measurement area 101 on the sample S is irradiated with infrared light emitted from the nanocarbon light source 10. The infrared light $L_{IR}$ emitted from the nanocarbon light source 10 is partially absorbed by the sample S due to, for example, molecular vibration of the sample S. The infrared light interacted with the sample S is detectable as a light transmitted through or reflected or scattered from the sample S. The light absorption in the sample S can be measured by observing at least one of the transmitted light $L_T$, the reflected light $L_R$, or the scattered light $L_S$ with the spectroscope/photodetector 110. Not only the intensity of infrared light can be measured by the spectroscope/photodetector 110, but also the absorption spectrum can be measured by spectroscopy using a diffraction grating, a Michelson interferometer, or the like.

The sample S may be substance in any phase, solid, liquid, or gas, and with the sample S positioned between the nanocarbon light source 10 and the spectroscope/photodetector 110, the state of the sample S can be detected and analyzed by the infrared analysis system 100. Because the nanocarbon light source 10 has a very small surface-emission structure, a part of the sample S can be locally measured by bringing the light source and the sample S close to each other. In particular, when the probe-type light source 20 illustrated in FIG. 2 is used, localized measurement can be performed by bringing the light source very close to the sample surface regardless of the shape of the sample S.

Figure 5:
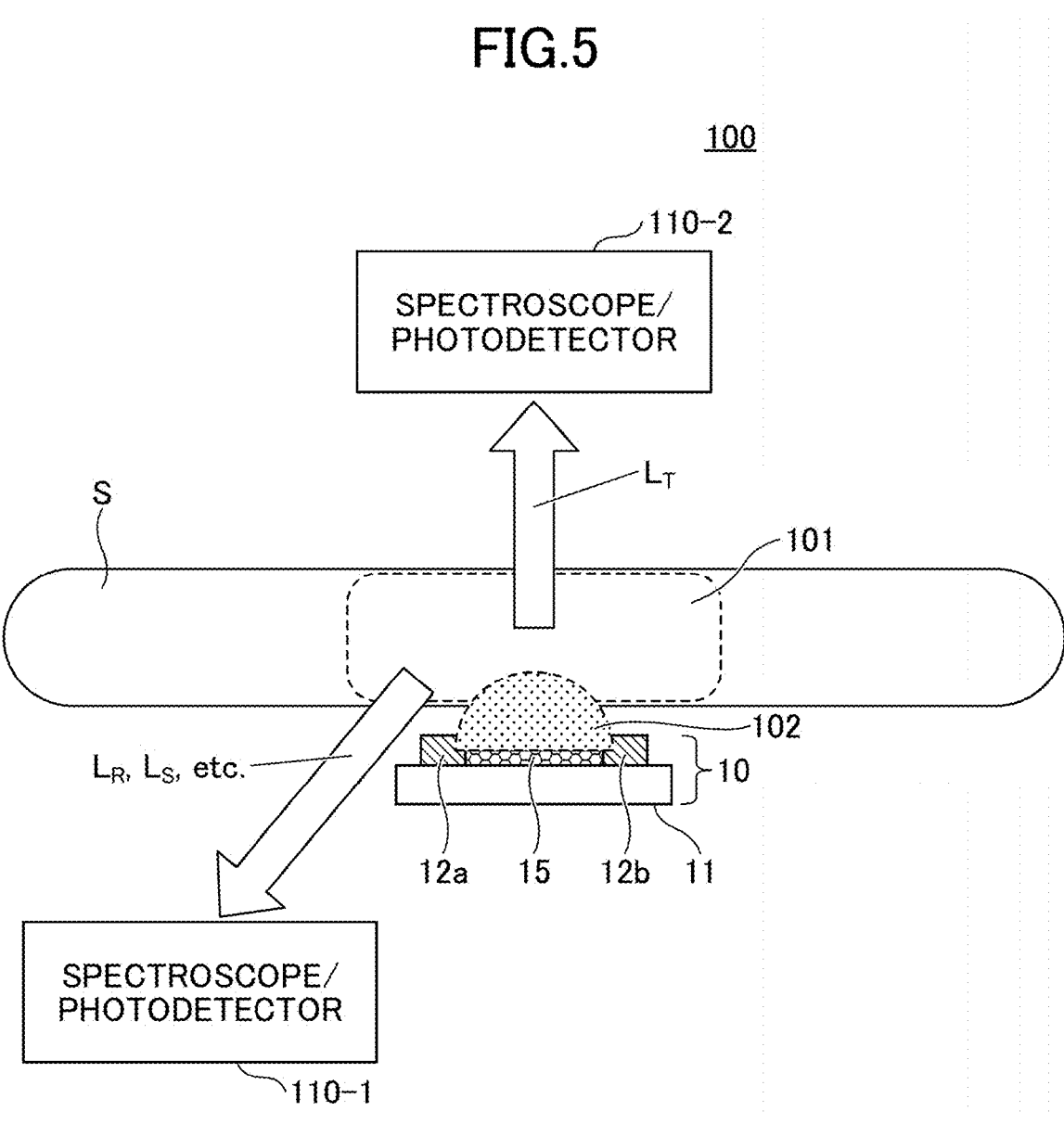
FIG. 5 is a diagram illustrating infrared local measurement using near field approach.

FIG. 5 illustrates localized infrared measurement using a near field. The nanocarbon light source 10 or the probe-type light source 20 using the nanocarbon light source 10 according to the embodiment has a planar structure in which the light source itself is minute and has a light emitting surface at the outermost layer. Using the luminescence property unique to nanocarbon, space-resolved local area measurement is realized by means of the near field generated in the vicinity of the nanocarbon light source 10.

The light emitted from the nanocarbon light source 10 can be used to measure the near field generated near around the light source, as well as for measuring the far field. The near field exponentially attenuates depending on the distance from the light source, and it exists only in the vicinity of the light source. The near-field light 102 can be extracted by bringing the sample S to be measured close to the nanocarbon light source 10, and it can be used for measurement Unlike the ordinary far-field light, the near-field light 102 is a local light defined by the size of the light source, regardless of the diffraction limit. Therefore, ultra-high spatial resolution local infrared measurement can be performed beyond the diffraction limit that is a hindrance in conventional infrared spectroscopy.

Because the size of the nanocarbon light source 10 can be reduced to the order of nanometers, an extremely small area can be measured, compared with conventional diffraction limit of 10 μm in infrared spectroscopy. The near field of the embodiment directly produced by the nanocarbon light source 10 itself is totally different from the near-field locally generated from an aperture or at the spherical surface of the metal tip of a sharp probe. The measurement using the infrared near field of the embodiment is based on a new theory completely different from conventional near-field spectroscopy.

In conventional near field spectroscopy, an electromagnetic field generated at the aperture or the tip of a needle probe by externally irradiating the aperture or the probe tip with a laser beam or the like. In contrast, near field analysis according to the present embodiment results from the fine nanocarbon light source 10 itself. A new principle of near-field infrared analysis is established using the "near field produced just in the vicinity of the light source", without externally introducing a laser beam, which is required in conventional techniques.

In order to use the near field produced from the light source itself, it is desired for the light source that "the light emission area has a planar structure exposed to the environment", in addition that "the light source is extremely small." This type of near-field measurement cannot be achieved unless the nanocarbon light source 10 of the embodiment having a planar structure in which the light emitting surface is exposed to the environment is used.

A halogen lamp, which is a conventional infrared light source, has a millimeter-order metal filament serving as a light emitting layer. The filament is sealed in a glass tube or the like, and the light emitting layer cannot be brought closer to the sample to be measured. In contrast, the nanocarbon light source 10 is a minute light source whose size can be reduced to the nanometer-order at the minimum, and has a planar structure with a nanocarbon light emitting layer exposed to the environment, thereby allowing the nanocarbon light source 10 to be brought very close to the sample S.

In particular, because the intensity of near-field light decreases exponentially with respect to the distance from the light emitting layer, the light emitting layer and the sample S have to be brought sufficiently close to each other, in a range shorter than the wavelength. Measurement making use of the near field produced in the vicinity of the light source itself is hardly achieved unless the light source has a planar shape, as in the embodiment. In addition, because the infrared analysis system 100 uses the near field produced by the minute nanocarbon light source 10 itself, it is unnecessary to use an expensive and large-sized laser source. Hence, a low-cost, ultra-small infrared analysis system 100 can be achieved.

The nanocarbon light source 10 may have a configuration in which the nanocarbon material 15 is completely exposed, as in FIG. 1A, or alternatively, the nanocarbon material 15 may be covered with a thin protective film 16 as illustrated in FIG. 1B. Even with a thin protective film 16, the near field is still available. In general, as long as the thickness of the protective film 16 is less than the wavelength of the light, problems will not arise. The thinner the protective film, the higher the intensity of near-field light.

The nanocarbon light source 10 can emit infrared light pulses as fast as a 100 picosecond-order response time, which is significantly different from conventional infrared light source such as halogen lamps. By applying a pulsed or rectangularly modulated voltage or current to the nanocarbon light source 10, a 100-picosecond order short pulse having a sharp rising edge can be obtained. Depending on the waveform of the applied voltage or current, a variety of intensity-modulated infrared light beams can be generated.

A currently used pulse laser may perform time-resolved spectroscopy using femtosecond to nanosecond short pulses in the ultraviolet, visible, or near infrared region, but no high-speed pulse laser source exists in the mid or far infrared region. Besides, because the wavelength band of a laser source is very narrow, a broad emission spectrum required for infrared spectroscopy or analysis cannot be acquired from a single laser source.

In contrast, the nanocarbon light source of the embodiment is an ultrafast light source as described above and in addition, its emission spectrum covers a very broad range of the infrared to visible region as described by the Planck's law for blackbody irradiation. The nanocarbon light source 10 can be used not only for infrared spectroscopic analysis in place of a conventional halogen lamp, but also for time-resolved infrared spectroscopic analysis as fast as time resolution of the 100-picosecond order, which could not be achieved using a halogen lamp. Such an ultrafast infrared analysis system has not existed so far, and the infrared analysis system 100 of the embodiment is a novel technology based on a new principle.

The infrared analysis system 100 of the embodiment is also applicable to infrared sensing using infrared analysis. In the field of spectroscopy, a spectrum is measured by a spectroscope or the like for analysis of a general material, but a spectroscope is generally a large and expensive device. On the other hand, the infrared analysis system 100 of the embodiment is capable of performing photodetection without using a spectroscope, by narrowing the infrared emission to a specific wavelength band using an optical filter or the like, whereby the presence or the absence, the concentration, the quantity, or the mixing ratio of a specific substance of solid, liquid, or gas can be determined. A variety of substances can be sensed by an ultra-compact structure using the nanocarbon light source 10, while a minute sensor system can be fabricated. During the sensing operation, the nanocarbon light source 10 can be brought very close to the sample S for measurement of the sample. A solid, liquid, or gas substance existing between the nanocarbon light source 10 and the spectroscope/photodetector 110 can also be sensed.

Figure 6:
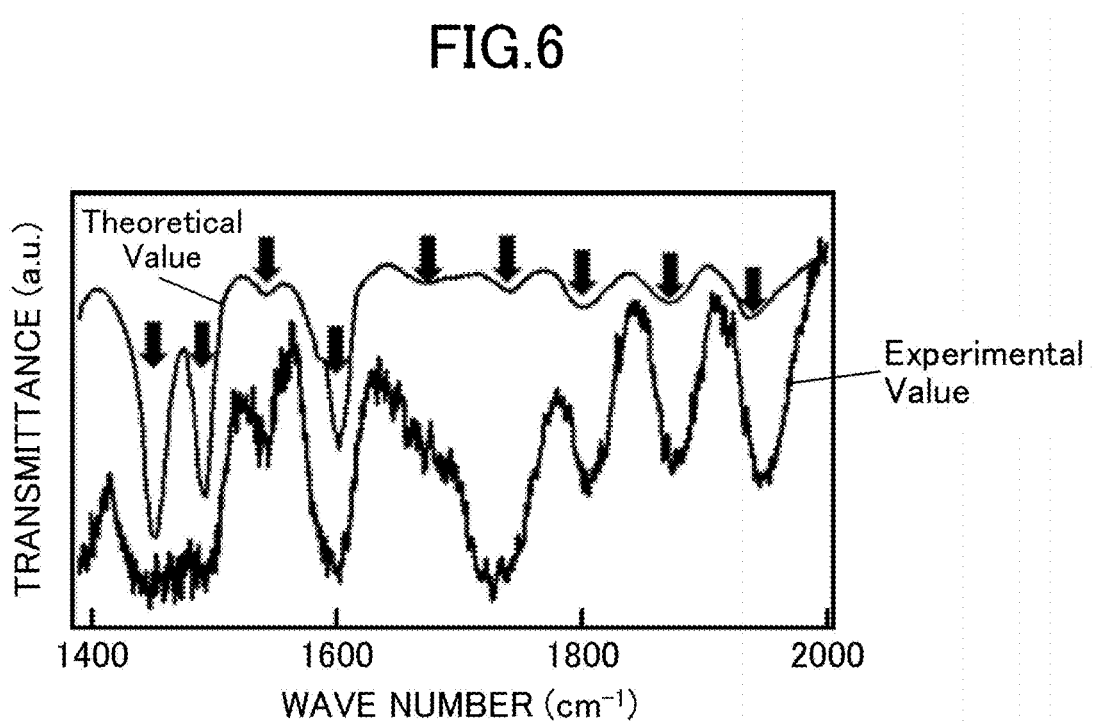
FIG. 6 presents a measurement result of polystyrene obtained by infrared analysis using a graphene light source according to the present invention.

FIG. 6 shows an example of infrared spectroscopy using a nanocarbon light source 10 formed of graphene. The nanocarbon light source 10 has a 500-micrometer square graphene layer serving as the nanocarbon material. A polystyrene sample is observed by infrared light transmitted through the sample based on the scheme illustrated in FIG. 5. The lower spectrum in the figure represents the experimental value measured by the infrared analysis system 100 using the nanocarbon light source 10, and the upper spectrum represents the theoretical value. The absorption peak of the spectrum agrees with the theoretical value, and the infrared analysis system 100 of the embodiment can acquire the result similar to that acquired by conventional FT-IR spectroscopy. This measurement result indicates that infrared spectroscopic analysis using the nanocarbon light source 10, including vibrational spectroscopy, can be put into practical use.

With the nanocarbon light source 10 of the embodiment, the emission intensity can be directly modulated by applying a modulated voltage or current. Because the nanocarbon light source 10 itself is capable of high-speed ON/OFF switching, unlike conventional infrared light sources, highly sensitive measurements using direct intensity modulation of the light source are possible. For example, by directly modulating the intensity of the light emitted from the nanocarbon light source 10, and receiving the light from the sample at the photodetector synchronized with the light modulation, highly sensitive photodetection can be achieved through synchronous measurement by a lock-in amplifier or a gate operation. Compared with spectroscopy using conventional infrared light sources, the nanocarbon light source allows highly sensitive infrared spectroscopy and sensing. In particular, when the light source operates at a high speed, time-resolved detection can be performed at the photodetector side even with a low-speed detector. This means that "low speed, high sensitivity" infrared detectors can be used, and that time-resolved measurement can be performed at high sensitivity, regardless of the type of infrared detector.

Figure 7A:
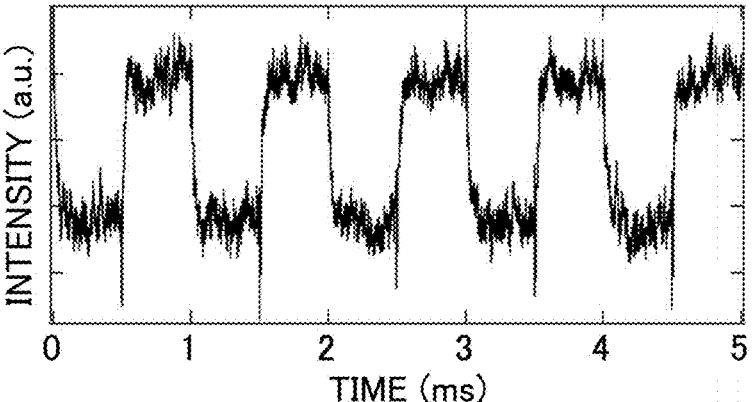
FIG. 7A presents direct intensity modulation of the nanocarbon light source of an embodiment.
Figure 7B:
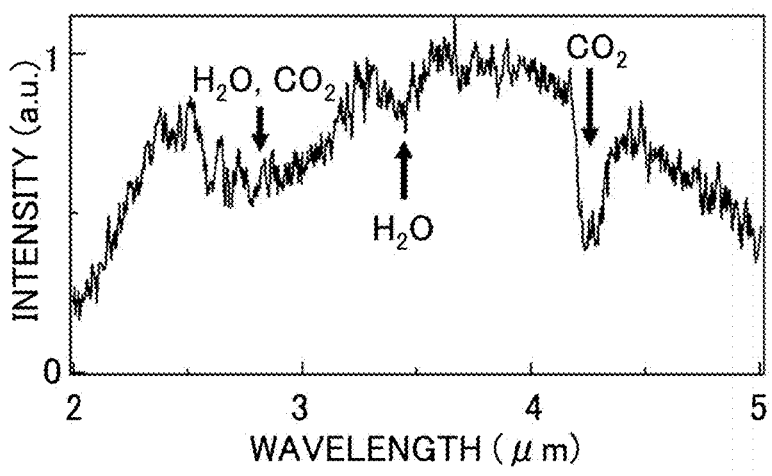
FIG. 7B presents an infrared spectroscopic measurement result of atmospheric molecules using intensity modulated infrared light.

FIG. 7A shows an example of direct intensity modulation using the nanocarbon light source 10. In this example, direct intensity modulation is performed at 1 kHz by the nanocarbon light source 10 using a 3-micron square graphene film. FIG. 7B is an atmospheric molecules analysis result of infrared spectroscopy using a light beam from the nanocarbon light source 10 directly modulated at 163 Hz and an infrared detector with a lock-in amplifier. Carbon dioxide molecules and water molecules in the atmosphere are detected in a broad wavelength range. Absorption peaks are observed in different wavelength ranges for water molecules and carbon dioxide, respectively, because the types of molecular vibrations are different.

As shown in FIG. 7A, the nanocarbon light source 10 of the embodiment can generate not only a single pulsed light by applying a single-pulse electrical signal, but also consecutive pulsed light by repeatedly applying a pulse voltage. Because direct modulation can be carried out at an extremely high speed, timings of the generated pulsed light can be easily controlled. Using these characteristics, high-speed infrared analysis can be performed with a single pulsed light generated at a desired timing. In addition, time-resolved measurement can be performed using pulsed light. In the infrared analysis using repetitive pulsed light, time-resolved measurement is also possible by providing a delay time to the generation of pulsed light, which enables stroboscopic time-resolved infrared analysis.

In this way, using the nanocarbon light source 10 having a broad spectrum and capable of high-speed modulation, new analysis schemes are possible with the infrared analysis system 100.

Second Embodiment

Figure 8:
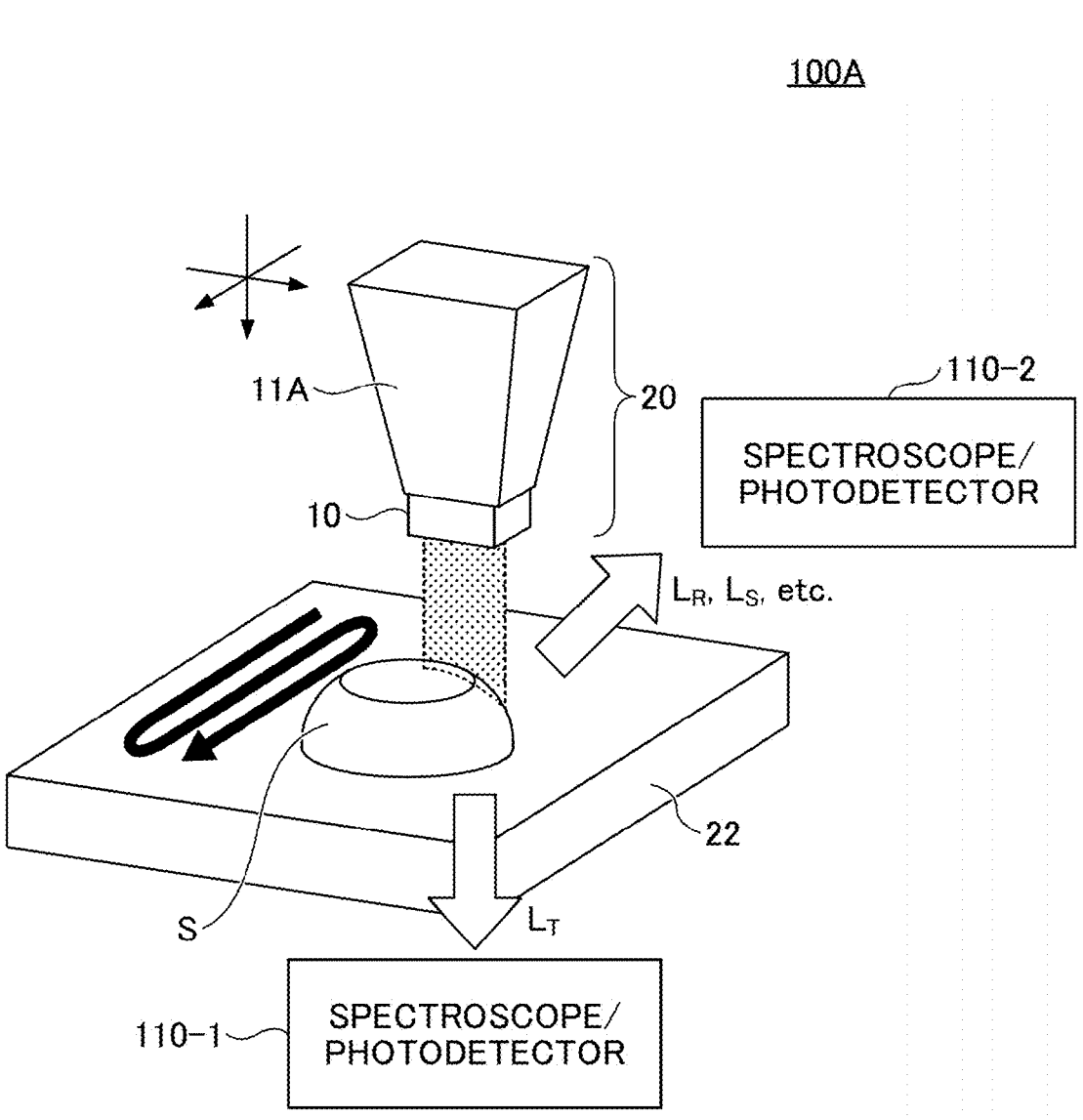
FIG. 8 is a schematic diagram of an infrared analysis system according to the second embodiment.

FIG. 8 is a schematic diagram of a scanning infrared analysis system 100A according to the second embodiment. In the second embodiment, infrared imaging is realized by scanning the nanocarbon light source 10 relative to the sample S.

The infrared analysis system 100A has a probe-type light source 20 with the nanocarbon light source 10 at the tip and spectroscopes/photodetectors 110-1 and 110-2. In the probe-type light source 20, a planar nanocarbon light source 10 is formed at the tip of a substrate 11A processed into a probe.

The sample S to be measured is placed on a light-transmissive stage 22 such as glass, and the light beam from the light source 20 is scanned relative to the sample S, while irradiating the sample S. At least one of the light source 20 and the stage 22 may be connected to a triaxial manipulator (not shown) so as to be movable in the triaxial directions. Thus, one of the nanocarbon light source 10 and the sample S moves relative to the other.

By detecting at least one of the transmitted light $L_T$, the scattered light $L_S$, and the reflected light $L_R$ from the sample S at the spectroscope/photodetector 110-1 or 110-2, the light absorption, the spectrum change, or other phenomena having occurred in the sample S can be acquired. By connecting the infrared analysis system 100A to an image processor, an infrared imaging system may be built, converting the detected signal into an image signal.

Unlike the conventional infrared light source, the nanocarbon light source 10 is extremely minute, and has a planar structure in which a light emitting layer is provided at the surface. By scanning the nanocarbon light source 10 one-dimensionally, two-dimensionally, or three-dimensionally relative to the sample 5, while bringing the light emitting layer very close to or in contact with the sample 5, one-dimensional, two-dimensional, or three-dimensional infrared imaging can be performed. The intensity or the spectrum of the transmitted, scattered, or reflected light changes through infrared absorption due to molecular vibration or the like inside the sample S. The change in the sample can be observed in a one-dimensional, two-dimensional, or three-dimensional image. Because the transmitted/scattered/reflected light can be split into different wavelengths by a spectroscope, wavelength-dependent imaging can be performed.

The infrared analysis system 100A is suitable not only for imaging, but also for analyzing a localized specific area. For example, the probe-type light source 20 may be fixed to a certain position over the sample S and perform infrared analysis on the minute area. Because the very small nanocarbon light source 10 is used as in the first embodiment, near-field measurement can be performed by bringing the nanocarbon light source 10 very close to the sample S at a distance equal to or shorter than the wavelength. Beyond the diffraction limit of light, high spatial resolution imaging or spectral imaging can be achieved. Using this scheme, the spatial resolution can be improved to the nanometer order making use of the near field, beyond the conventional resolution of about 10 μm due to the diffraction limit in the conventional infrared spectroscopy. As for the sample S to be measured, an object of any shape can be imaged. The infrared analysis system 100A is applicable to bioimaging of biological tissues such as cells, as well as imaging of ordinary liquid or solid samples. Consequently, imaging in the fields of chemistry, biotechnology, materials, and physics is available.

Figure 9:
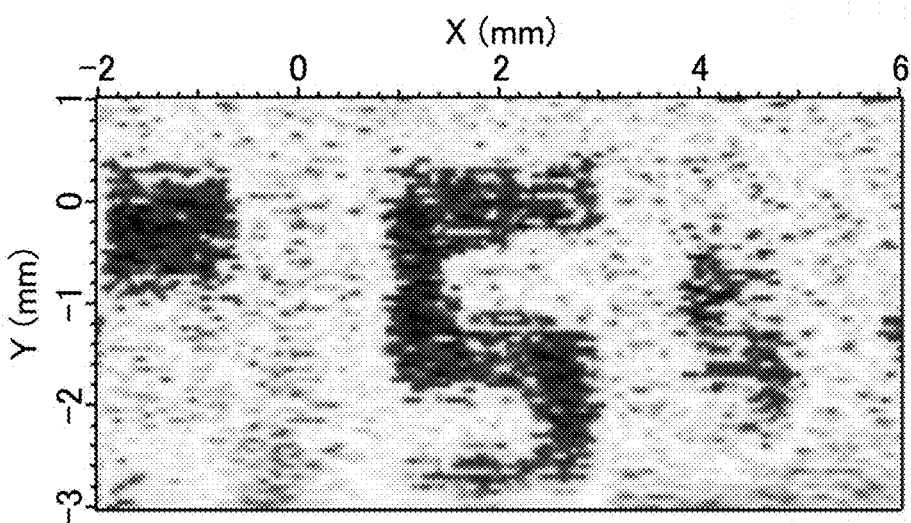
FIG. 9 presents an example of infrared imaging measurement by a nanocarbon light source.

FIG. 9 shows an example of infrared imaging using the infrared analysis system 100A. In this example, the sample S with a pattern of number "5" formed on a glass is driven relative to the nanocarbon light source 10 using graphene. It is clearly seen that an infrared image reflecting the shape of the sample S is acquired.

Third Embodiment

Figure 10:
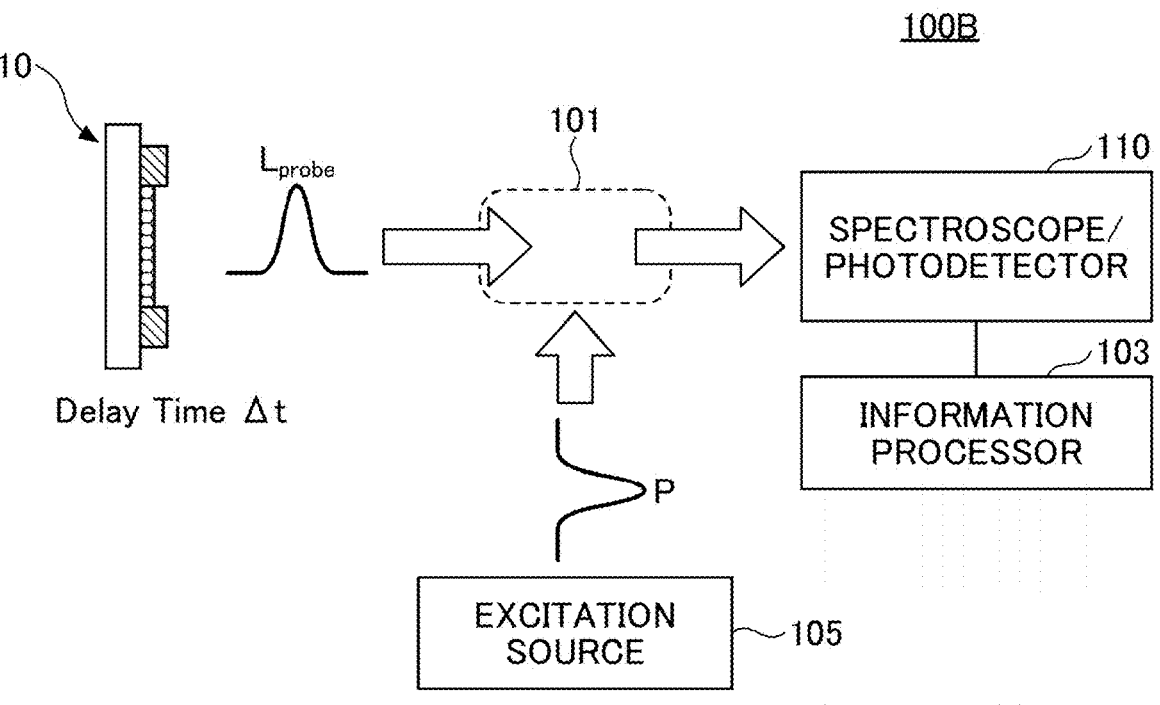
FIG. 10 is a schematic diagram of an infrared analysis system according to the third embodiment, illustrating the basic idea of high-speed infrared spectroscopic analysis.

FIG. 10 is a schematic diagram of an infrared analysis system 100B of according to the third embodiment. In the third embodiment, pump-probe spectroscopy or infrared analysis using the nanocarbon light source 10 is proposed. The infrared analysis system 100B includes a nanocarbon light source 10, an excitation source 105, and a spectroscope/photodetector 110. The nanocarbon light source 10 is used as a probing light source that outputs infrared probing light $L_{probe}$. The output of the spectroscope/photodetector 110 may be connected to the input of the information processor 103.

Conventional light sources such as halogen lamps or ceramic light sources, which have a low response speed (about 100 ms), are incapable of high-speed infrared spectroscopy or highly time-resolved measurement based upon modulation of the light source. For example, chemical reactions changing from moment to moment cannot be traced using conventional infrared spectroscopic methods.

In contrast, the nanocarbon light source has an ultrahigh response speed of light emission of the 100-picosecond order. By using the nanocarbon light source 10 as the probing light source, the infrared analysis system 100B has ultrahigh time resolution of 100 picoseconds. The infrared analysis system 100B can trace very fast chemical reaction by infrared analysis. As described above, when the light source operates at high speed, the detector side can also implement time-resolved measurement even with a low speed detector. Accordingly, an ultrasensitive photodetector can be used for the spectroscope/photodetector 110.

In the measuring system of the infrared analysis system 100B, a chemical reaction pulse stimulus P for starting a chemical reaction is applied to the measurement area 101 of the sample S from the excitation source 105, such as a laser pumped light source. The measurement area 101 is irradiated with a pulse of the probing light $L_{probe}$ which is output from the nanocarbon light source 10 by a delay of Δt seconds after the irradiation of the pumped pulse. A stimulation pulse for causing a chemical reaction is not limited to the laser pulse as long as the sample is stimulated to initiate the chemical reaction, and electrical stimulation or other stimulations including application of an electrochemical reaction voltage or a reactant pulse may be carried out.

Photochemical reactions can be started by irradiating the sample to be measured with light. In an electrochemical reaction, an electrode is provided onto the sample to be measured to causes an electrochemical reaction, and an electric signal such as a reaction start voltage is input to the electrode. When supplying the reactant, substances required for the chemical reaction may be supplied from a fluidic channel or the like to cause a reaction upon mixing of the substances. These chemical reaction pulse stimuli may have a waveform illustrated in FIG. 10, or a rectangular stimulus may be applied.

The change caused in the sample by the stimulation is observed by detecting the transmitted, scattered, or reflected light from the sample at the spectroscope/photodetector 110. The photodetection result may be supplied to the information processor 103 and subjected to signal processing, analysis or the like to provide, for example, an infrared absorption result due to vibration of the excited molecules. The information processor 103 may have a digital signal processing function such as a spectrum analyzer or a digital image converter.

Figure 11:
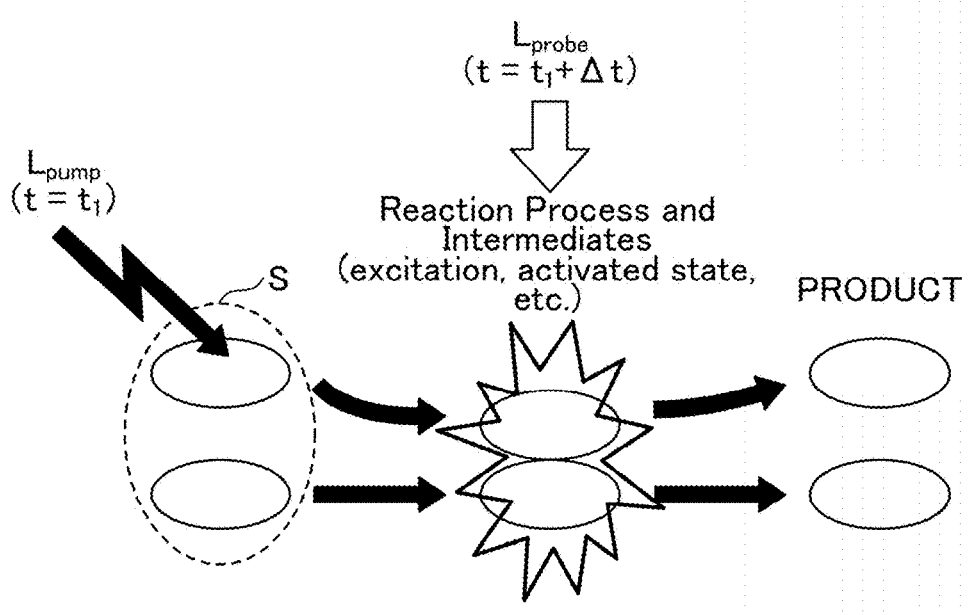
FIG. 11 is a schematic diagram illustrating a change in a substance caused by chemical reaction pulse stimulation.

FIG. 11 illustrates an example of change occurring in the measured substance due to the stimulation of chemical reaction. When a chemical reaction pulse stimulus is applied to the sample in the measuring system of FIG. 10, the chemical reaction proceeds by the chemical reaction stimulation as shown in FIG. 11, and the final product is obtained through the reaction process and intermediates. At a delay time Δt seconds after the application of the chemical reaction pulse stimulus ($L_{pump}$) at time t1, the sample S is irradiated with infrared light which is the probing light $L_{probe}$ emitted from the nanocarbon light source 10, the sample S during the reaction process or in the state of intermediate production is measured. By detecting the transmitted/scattered/reflected light from the sample S at the spectroscope/photodetector 110, the reaction process or the intermediate can be analyzed by means of vibrational spectroscopy or the like.

When the delay time Δt is changed little by little, time-dependent infrared analysis can be performed on the sample S. By measuring the delay-time dependency, the moment-by-moment progress of the reaction process of the sample S can be traced and analyzed by infrared spectroscopy. A spectroscope using a grating or a Michelson interferometer may be used as the spectroscope for this measuring system. In the measurement of Michelson interferometry, time-resolved step-scan measurement using a high-speed light source is also be possible.

Unlike the conventional techniques, high-speed time-resolved measurement is performed on the infrared light source side (i.e., the nanocarbon light source 10). Accordingly, it is unnecessary to use a high-speed photodetector in order for improving the time resolution of infrared analysis, and a low-speed photodetector may be used. In general, a high-speed photodetector is poor in photosensitivity, while a high-sensitivity photodetector is slow in detection speed, and there is a trade-off between sensitivity and speed. Owing to the configuration and the technique of the embodiment, high-speed time resolution can be achieved using a highly sensitive photodetector which cannot be used in the conventional techniques.

Figure 12:
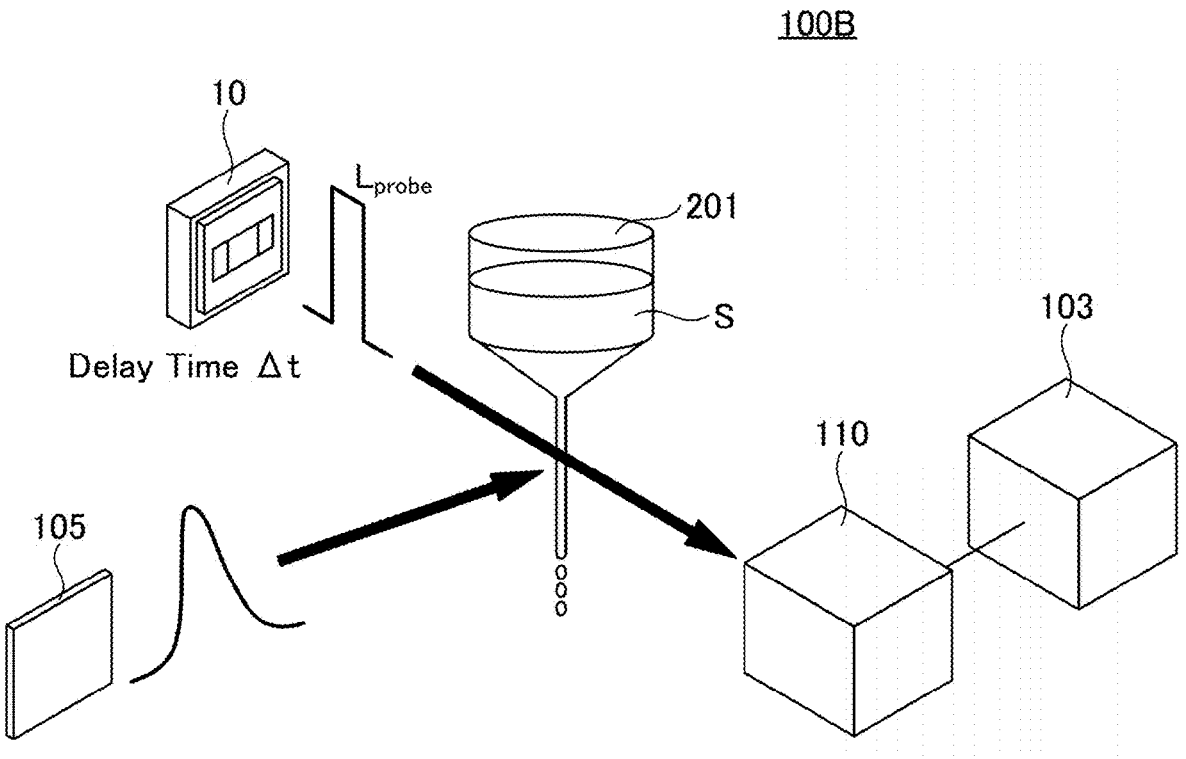
FIG. 12 illustrates an example of fast time-resolved measurement by repeating chemical reaction pulse stimulation and infrared pulse irradiation from a nanocarbon light source.

FIG. 12 illustrates an example of the measuring system based on repetition of chemical reaction pulse stimulation and irradiation of probing light. By repeating the chemical reaction pulse stimulation from the stimulation source 105 and irradiation of the infrared pulsed light from the nanocarbon light source 10, high-sensitivity, high-speed, time-resolved measurement can be achieved. The basic theory and the device configuration itself are the same as those of the infrared analysis system 100B of FIG. 10.

A gas, liquid, or solid sample may be placed in the measurement area 101. The sample S may be supplied via a flow cell 201 or the like. Infrared light ($L_{probe}$) is emitted from the nanocarbon light source 10 with a delay time $\Delta t$ with respect to the chemical reaction pulse stimulation, and stimulation and probing are repeated. The infrared light emitted from the carbon light source may be, for example, an infrared ultrashort pulse. The reaction by the pulse stimulation and the probing by the infrared irradiation are repeatedly performed at high speed. The measurements may be subjected to integration or summation at the spectroscope/photodetector 110 or the information processor 103 such that the S/N ratio is improved to the extent corresponding to the number of repetitions to achieve highly sensitive measurement.

As has been described above with reference to FIG. 10 and FIG. 11, any stimulation that can start chemical reaction may be employed as the chemical reaction pulse stimulus, such as photochemical reaction excitation light, electrochemical reaction voltage, or reactant pulse supply. Also, there are various methods for applying a stimulus. By carrying out measurement while gradually changing the delay time $\Delta t$, the reaction process that progresses every moment can be observed and analyzed. A grading or Michelson interferometer may be used for the spectroscope, and a step-and-scan scheme may be used. A low-speed high-sensitivity photodetector can be used as the photodetector, and consequently, high-sensitivity measurement is achieved.

High-speed time-resolved measurement by the infrared analysis system 100B of the third embodiment may involve precise control on the delay time, but it is feasible because the nanocarbon light source 10 can produce an extremely short pulse of infrared at suitable timings. This fact takes full advantage of the nanocarbon light source 10 that is a high-speed light source capable of direct modulation.

Figure 13:
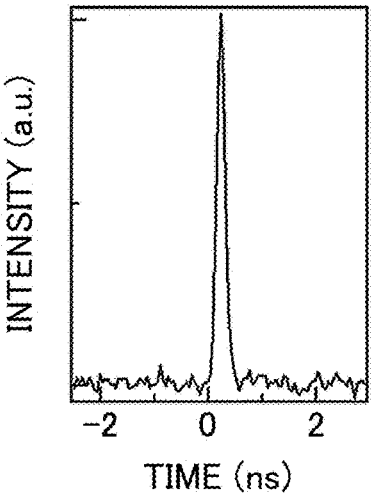
FIG. 13 presents short pulse emission from a nanocarbon light source.

FIG. 13 shows short pulse emission from the nanocarbon light source 10. The time resolution of the infrared analysis system 100B is determined by the response speed of the light emission of the nanocarbon light source 10. By using the nanocarbon light source 10, high-speed, time-resolved measurement using a short pulse of the 100-picosecond order is achieved as shown in FIG. 13.

Fourth Embodiment

Figure 14:
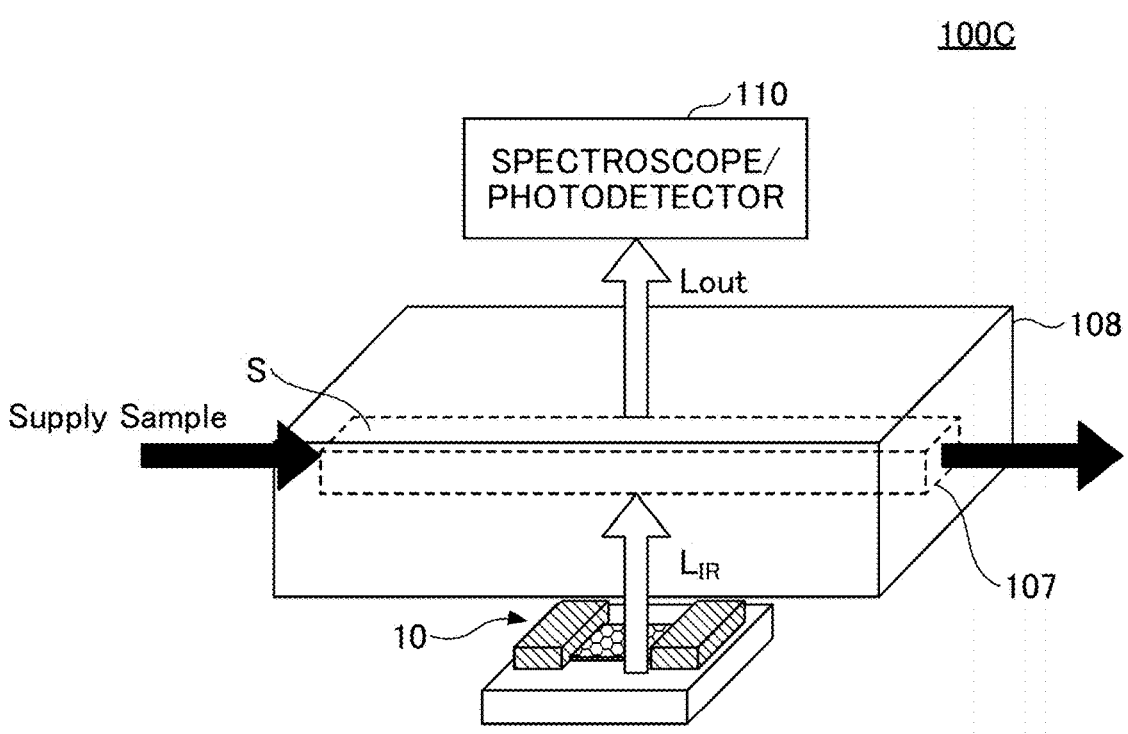
FIG. 14 is a schematic diagram of an infrared analysis system according to the fourth embodiment, illustrating infrared measurement using a microanalysis chip having microchannels.

FIG. 14 is a schematic diagram of an infrared analysis system 100C according to the fourth embodiment. In the fourth embodiment, infrared analysis using a microanalysis chip having a microchannel is proposed. The microanalysis chip is an example of an infrared analysis chip that allows efficient infrared spectroscopy (or absorption) analysis.

The infrared analysis system 100C has a nanocarbon light source 10 and a spectroscope/photodetector 110. The microanalysis chip 108 may be positioned between the nanocarbon light source 10 and the spectroscope/photodetector 110. A microchannel 107 is formed in the microanalysis chip 108, and the sample S is supplied into the microchannel 107. The microanalysis chip 108 with the microchannel 107 is effectively applied to a very small volume of chemical analysis, bioanalysis, medical diagnosis, and so on.

The nanocarbon light source 10 is very small, and in addition, it can be fabricated on an inorganic or organic material including silicon, glass, and polymers and the like. Because the nanocarbon light source 10 has a planar structure in which the light emitting layer can be exposed to the environment, the nanocarbon light source 10 can be positioned adjacent to the microchannel 107 of the microanalysis chip 108, and on-chip measurement or analysis can be performing using the infrared light $L_{IR}$ emitted from the nanocarbon light source 10.

For the microanalysis chip 108, a chip body with the microchannel 107 can be fabricated using inorganic materials, such as silicon or glass, or organic materials, such as resins or polymers. The nanocarbon light source 10 may be positioned near (for example, directly below) the microchannel 107. The infrared light emitted from the nanocarbon light source 10 irradiates the sample S flowing through the microchannel 107, and the transmitted, scattered, or reflected light (Lout) from the sample S is observed by the spectroscope/photodetector 110. This configuration enables infrared analysis or sensing of the substance flowing through the microchannel 107.

As illustrated in FIG. 14, the nanocarbon light source 10 may be fixed outside the microanalysis chip 108 by bonding or the like so as to face the microchannel 107. Because the nanocarbon light source 10 is very minute and has a planar structure directly fabricable on many sorts of substrates, the nanocarbon light source 10 may be directly formed on the microanalysis chip 108 having the microchannel 107, or it may be directly formed inside the microchannel 107. The nanocarbon light source 10 provides a novel microanalysis chip 108 with a light source, which is never realized by a conventional infrared light source.

The microchannel 107 may be designed to introduce chemical reaction pulse stimulus such as photochemical reaction excitation light, electrochemical reaction voltage, or reactant pulse supply, as in FIG. 10 to FIG. 12 (for the third embodiment). In this case, time-resolved measurement similar to the third embodiment can be performed. For example, in the measuring system of FIG. 14, the microchannel 107 may be externally irradiated with pump light to cause a photochemical reaction, an electrode for an electrochemical reaction may be formed in the microchannel 107 to apply an electrical stimulus, or multiple microchannels 107 may be formed to initiate a mixing reaction at the meeting point of the microchannels, or to initiate an interface reaction between layers. By initiating the chemical reaction under stimulation on the sample S, and by controlling the delay time Δt which is a time difference between the reactive stimulation and pulse irradiation by the nanocarbon light source 10, high-speed, time-resolved measurement can be achieved.

Figure 15:
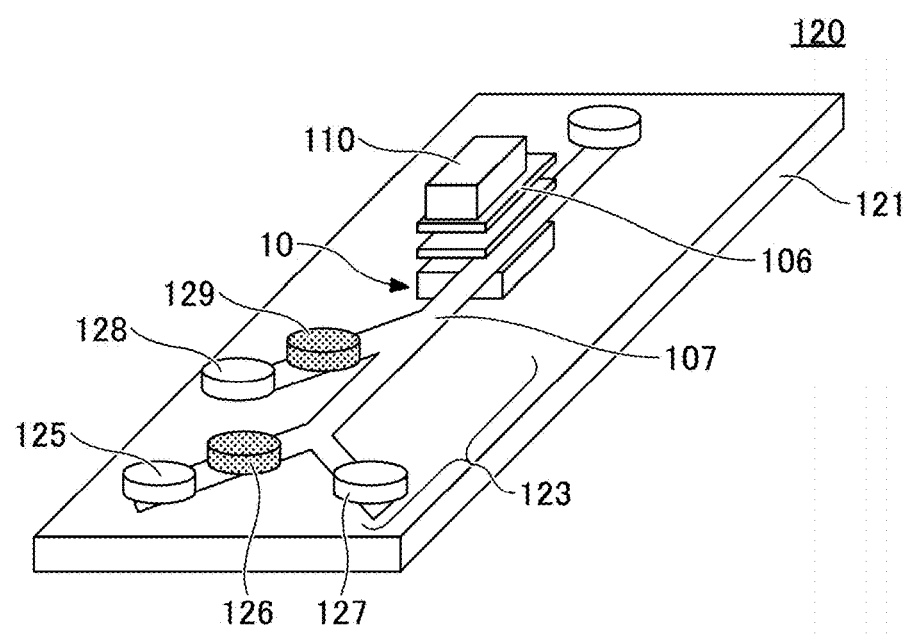
FIG. 15 is a schematic diagram a microanalysis chip in which a nanocarbon light source and a detector are integrated on a substrate.

FIG. 15 is a schematic diagram of a microanalysis chip 120 in which the nanocarbon light source 10 and the detector are integrated onto a substrate. A spectroscope/photodetector 110 and an optical filter 106 such as a bandpass filter may be integrated into the microanalysis chip 120 having the nanocarbon light source 10. This configuration allows a full on-chip type microanalysis chip 120 in which all the optical components are integrated on a chip, without using an external spectroscope or a photodetector.

In the example of FIG. 15, the micro-channel 107 may be formed above the nanocarbon light source 10 in the stacking direction, and the spectroscope/photodetector 110 may be positioned above the micro-channel 107 so as to directly measure the reaction (infrared absorption, etc.) between the sample flowing through the microchannel 107 and the infrared light output from the nanocarbon light source 10. The microanalysis chip 120 having the micro channel 107 is also an example of the infrared analysis chip.

The microchannel 107 may be branched into multiple channels. By providing supply nozzles 125 to 129 in the branched channels, a microchannel/reactor 123 may be configured. For example, fluid A may be supplied from the supply nozzles 125 and 128, fluid B may be supplied from the supply nozzles 126 and 129, and fluid C may be supplied from the supply nozzle 127. At the confluence of the flow paths, the mixture of the fluids passes above the nanocarbon light source 10.

When an optical filter 106 is formed above or below the microchannel 107, a light component of only a specific wavelength can be detected for sensing/analysis. In this sensing/analysis, a single-device photodetector may be used as the spectroscope/photodetector 110, or alternatively, a photodetector array may be used. In the latter case, optical filters with different center wavelengths may be arranged in an array and spectroscopic analysis may be performed on the chip.

Because the nanocarbon light source 10 is very small and suitable for high level integration, multiple nanocarbon light sources are easily integrated into an array, and spectroscopic analysis can be performed even when a single set of spectroscope/photodetector 110 is used. For example, multiple optical filters 106 with different center wavelengths may be arranged in an array so as to face the corresponding nanocarbon light sources 10 arranged in the array. By controlling the ON/OFF timing of each of the nanocarbon light sources 10 in the array, the single set of spectroscope/photodetector 110 can perform spectroscopy.

Time-resolved measurement based on the chemical reaction pulse stimulation of the third embodiment (FIG. 10 to FIG. 12) may also be applied to the microanalysis chip 120 of FIG. 15. In this case, a highly integrated time-resolved measuring chip is achieved.

Fifth Embodiment

Figure 16:
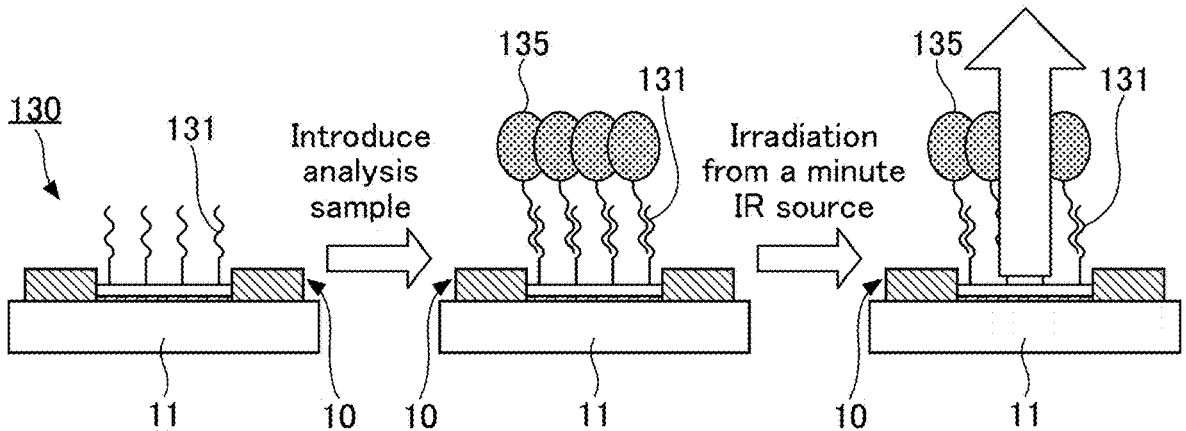
FIG. 16 illustrates the basic operation of infrared analysis system according to the fifth embodiment.

FIG. 16 is a diagram explaining the theory of infrared analysis according to the fifth embodiment. The fifth embodiment provides infrared analysis using a biochip in which a probe substance is fixed to the minute infrared light source such as the nanocarbon light source 10. The biochip of this embodiment is also an example of infrared analysis chip. A sample to be analyzed is supplied onto the biochip.

A sample substance contained in the sample is bound to the probe substance fixed to the minute infrared light source, thereby rapidly completing infrared analysis in a simple manner.

A biochip is currently known as an application of semiconductor microfabrication technique to the biotechnology field. In a biochip, one or more fixed probes (DNA, protein, sugar chain, cell, molecule, etc.) are provided on the surface of a semi-conductive or insulative substrate. The fixed probes may be arranged one-dimensionally or two-dimensionally in an array. Analysis is performed using the nature of the sample substance (DNA, protein, sugar chain, cell, molecule, etc.) selectively binding to the fixed probe on the substrate.

In a typical analysis using a biochip, a "fluorescent substance" is attached to a fragment of the sample substance, and the fluorescence pattern is detected and analyzed to examine the sample substance. Such phosphor-based analysis is expensive because phosphor is very expensive and because the analysis system itself is large.

In the fifth embodiment, one or multiple minute infrared light sources (such as the nanocarbon light sources) is/are arranged along or in a one-dimensional or two-dimensional array on the substrate surface, and probes are fixed onto the minute infrared light sources. A sample substance selectively bound to the fixed probe can be identified, detected, or analyzed based on infrared absorption or other phenomena of the light output from the minute infrared light source.

In FIG. 16, the fixed probe 131 is arranged on a minute infrared light source such as the nanocarbon light source 10 formed on the substrate 11, whereby a light source integrated biochip 130 is fabricated. The fixed probe 131 may be a DAN, protein, sugar chain, cell, molecule or the like. The fixed probe 131 selectively binds to a specific sample substance (DNA, protein, sugar chain, cell, molecule, etc.). The fixed probe 131 may be bound directly to the nanocarbon light source formed as a minute infrared light source, or alternatively, a cap layer may be provided over the nanocarbon light source 10 and the fixed probe may be bound to the cap layer.

When an analytic sample is introduced onto the minute infrared light sources with fixed probes 131, a sample substance 135 that can selectively bind to the fixed probe 131 is captured by the fixed probe 131. Because the binding between the fixed probe 131 and the sample substance 135 is selective, the material of the fixed probe 131 can be determined so as to capture only a specific sample substance 135. Using this property, the sample substance is identified, detected, and examined to specify the molecular structure or the like.

When light is emitted from the minute infrared light source after introduction of the analytic sample, infrared absorption occurs in the sample or the marker molecule modifying the sample positioned directly above the micro infrared light source. By observing the spectrum or the transmittance of the infrared light transmitted through the analytic sample captured on the minute infrared light source, the analytic sample can be identified, detected, or analyzed based on the infrared absorption due to molecular vibrations inside the sample.

The configuration of the fifth embodiment does not need a fluorescent marker which is required in the conventional biochip analysis. In this embodiment, the sample substance 135 itself, or the molecule itself that modifies the sample substance 135 serves as a marker, in place of an expensive fluorescent substance marker, and infrared absorption due to the molecular vibration can be effectively used. Instead of fluorescent markers that emit visible light, infrared absorption by a molecule is used. Non-luminescent molecules not used as markers in the conventional techniques can be used as effective markers for biochip analysis, and low-cost biochip analysis can be achieved.

The minute light source may be a compound semiconductor light emitting device or an organic light emitting device that operates in the infrared region. When the nanocarbon light source 10 is used as the minute light source, light emission in the visible range can also be used, and a biochip 130 using visible light absorption can also be developed. In addition, using the visible light from the nanocarbon light source 10 as an excitation light beam, conventional analysis using a phosphor may be performed.

Figure 17:
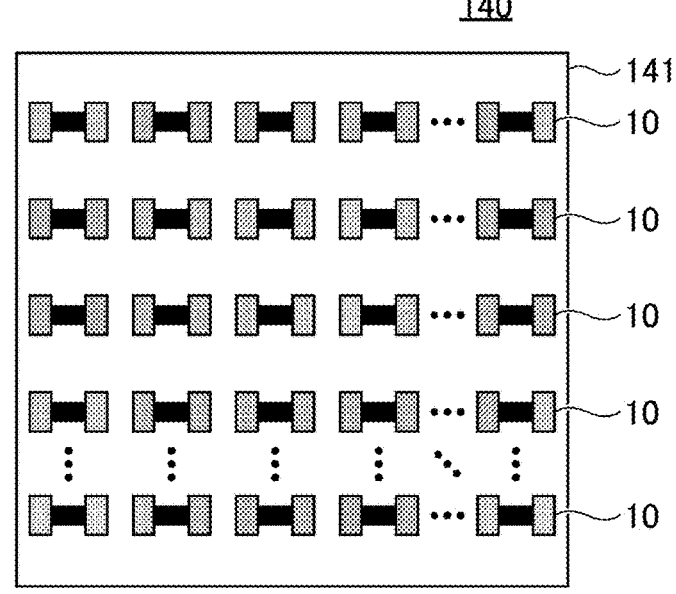
FIG. 17 is a schematic diagram of an infrared light source array applied to the biochip of an embodiment.

FIG. 17 is a schematic diagram of the infrared light source array 140 applied to the biochip 130 of the embodiment. In the biochip analysis of FIG. 16, minute infrared light sources are arranged one-dimensionally or two-dimensionally in an array, and high-speed, high-volume bioanalysis is achieved. In FIG. 17, many nanocarbon light sources 10 are arranged in a two-dimensional array on a substrate 141. Using the nanocarbon light sources 10, an infrared light source array 140 can be obtained easily at low cost because the nanocarbon light sources are easy to fabricate in spite of the extremely small size.

Each of the nanocarbon light sources 10 arranged in the array has a fast response for light emission, and it can be ON/OFF controlled independently from the other at a different timing.

Figure 18A:
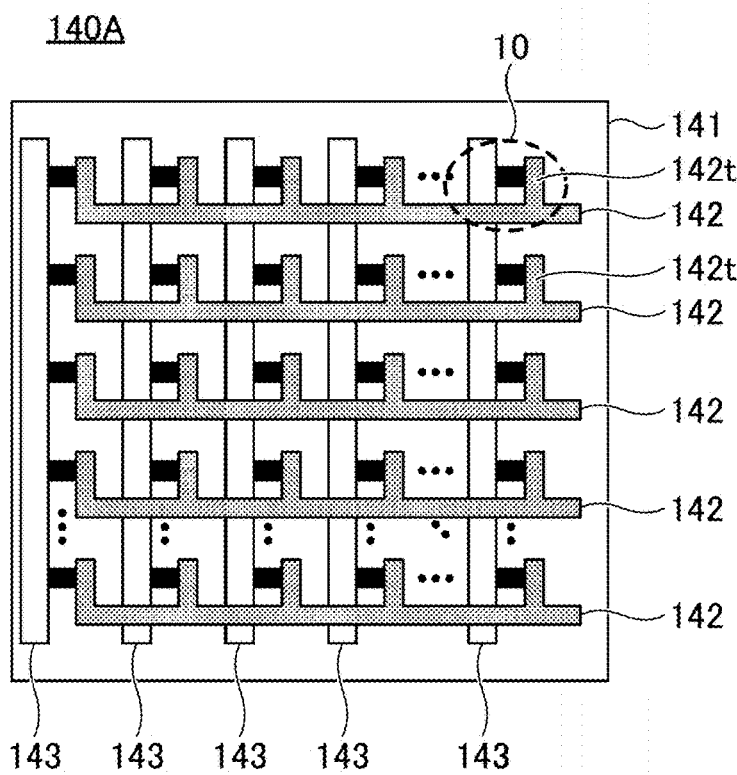
FIG. 18A is a schematic diagram of an infrared light source array using matrix electrodes.
Figure 18B:
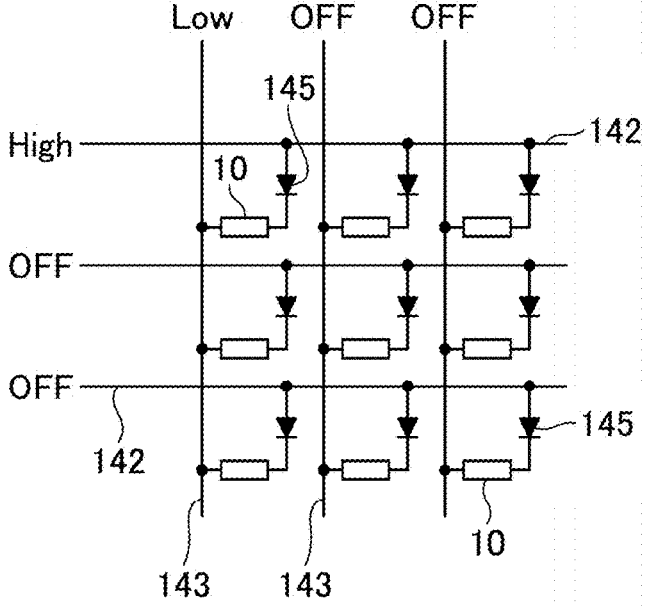
FIG. 18B is a circuit diagram in which rectifying function is provided to the infrared light source array of FIG. 18A.

FIG. 18A illustrates an infrared light source array 140A using a matrix electrode as a modified example. FIG. 18B is a circuit diagram of an infrared light source array having a rectifying function. In FIG. 18A, electrodes 142 extending in the horizontal direction and electrodes 143 extending in the vertical direction are electrically insulated from each other and arranged crossing each other in a plan view. Each of the horizontal electrodes 142 has comb electrode portions 142t. Each of the comb electrode portions 142t is adjacent to corresponding one of the vertical electrodes 143 to form an electrode pair. A carbon nanomaterial is connected to the electrode pair to form a cell of a nanocarbon light source 10.

As shown in FIG. 18B, each cell may be provided with a rectifying effect. In this configuration, a rectifier (such as a diode) 145 is connected in series with the resistive nanocarbon light source 10. The rectifier 145 suppresses the reverse flow path of the electric current such that only a target nanocarbon light source 10 at a desired position emits light.

For example, a high voltage is applied to a selected one of the horizontal electrodes 142, and the other horizontal electrodes 142 are turned off. A low voltage is applied to a selected one of the vertical electrodes 143, and the other vertical electrodes 143 are turned off. The nanocarbon light source 10 positioned at the intersect of the selected horizontal electrode 142 and vertical electrode 143 emits light. With this configuration, an electric current is prevented from flowing into non-selected light sources and the light emission efficiency of the selected light source can be improved, while suppressing malfunction or erroneous light emission of the other light sources.

Figure 19:
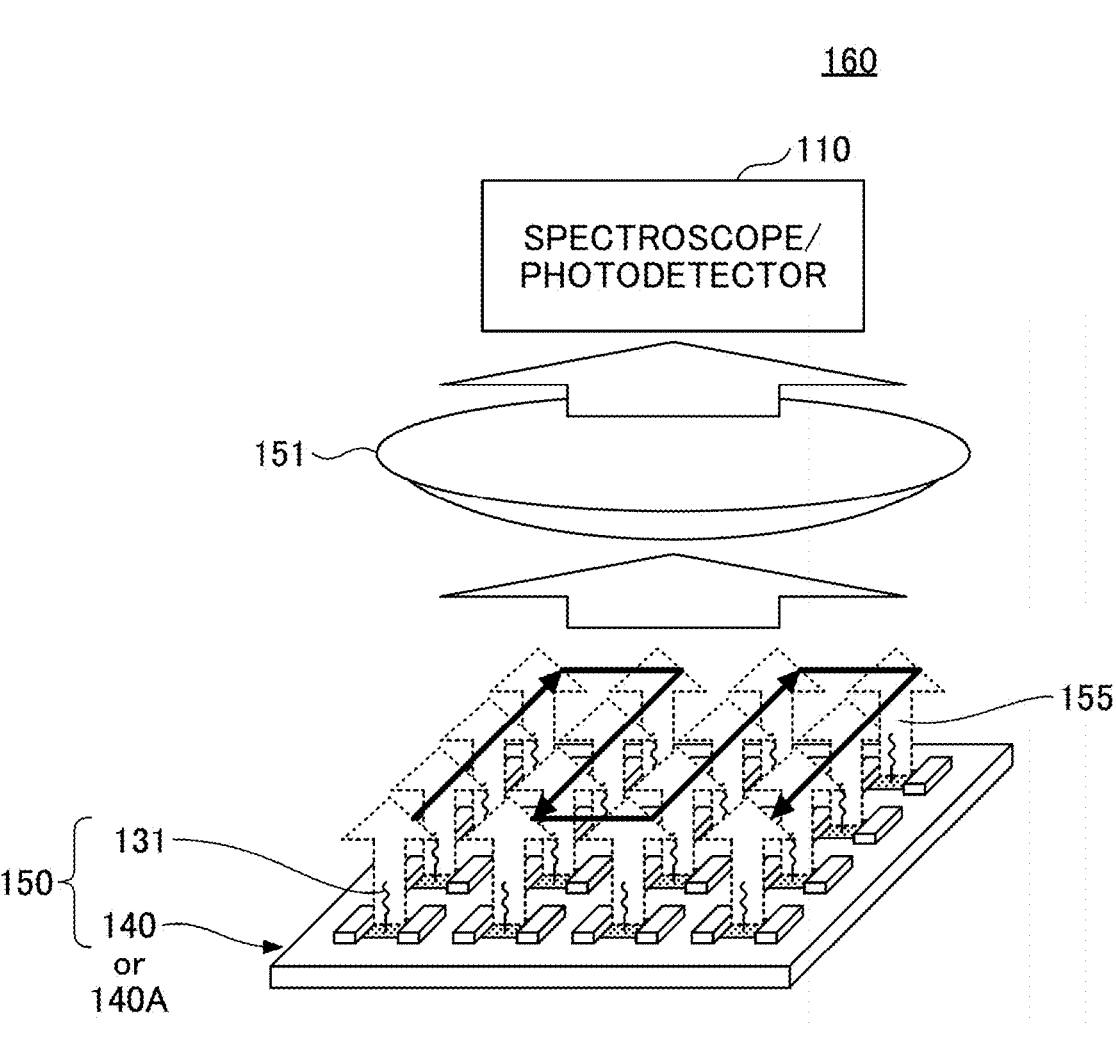
FIG. 19 is a schematic diagram of an infrared analysis system 160 according to the fifth embodiment.

FIG. 19 is a schematic diagram of an infrared analysis system 160 according to the fifth embodiment. The infrared analysis system 160 has a biochip 150 in which an infrared light source array 140 (or 140A) is integrated, and a spectroscope/photodetector 110. The biochip 150 is an example of the infrared analysis chip. A condenser lens 151 may be provided between the biochip 150 and the spectroscope/photodetector 110.

In the infrared light source array 140 (or 140A) of the biochip 150, fixed probes 131 illustrated in FIG. 16 are provided in the respective nanocarbon light sources 10 arranged in a one-dimensional or two-dimensional array, as in FIG. 17 or 18. When a target sample substance 135 is bound to the fixed probe 131, the infrared light 155 emitted from the nanocarbon light source 10 is absorbed in the sample substance, and spectroscopic analysis becomes available based on the infrared absorption. Even when a single set of spectroscope/photodetector 110 is used as in FIG. 19, two-dimensional on-chip analysis can be performed by controlling the emission timing of the respective nanocarbon light sources 10 and by synchronizing the detection timing with the emission timing. For example, as indicated by the black arrows in FIG. 19, the nanocarbon light sources 10 in the array may be sequentially selected and turned on to acquire information one by one from the cells at the spectroscope/photodetector 110.

Multiple types of fixed probes 131 required for analysis may be provided to each of the nanocarbon light sources 10 of the biochip 150. In this case, different types of sample substances 135 can be simultaneously detected and analyzed using the different types of fixed probes 131. A target sample substance to be analyzed is introduced onto the biochip 150 to as to come into contact with the multiple types of the fixed probes 131. Depending on the types of the fixed probes 131 and the binding forces between the sample substance 135 and the fixed probes 131, the sample substance 135 binds to a specific type of the fixed probe 131, but does not bind to the other types of the fixed probes 131.

Then the arrayed nanocarbon light sources are sequentially turned on, and the infrared light 155 is detected by the spectroscope/photodetector 110 synchronously with the light emission timing of the nanocarbon light sources 10. From the detection result, whether a target sample substance 135 is binding to a certain fixed probe 131 can be determined.

Based on the same theory as described with reference to FIG. 16, infrared absorption occurs in the sample substance 135 itself, or in the molecule modifying the sample substance 135 due to molecular vibration or the like. The sample substance 135 can be identified, detected, or analyzed by measuring the transmittance or the spectrum of the infrared light 155 having passed through the sample substance 135 bound to the fixed probe 131 on the nanocarbon light source 10. No expensive fluorescent markers are required, and non-luminescent molecules that could not be used as a marker in the conventional technique can be used as a marker for biochip analysis of the embodiment.

Because the nanocarbon light sources 10 are arranged in an array, analysis using different types of fixed probes 131 can be simultaneously performed on the same biochip 150. The biochip 150 is inexpensive, and it enables high-speed and high-volume analysis. In this biochip analysis using the nanocarbon light source 10 as an infrared light source, very small light sources can be arrayed one-dimensionally or two-dimensionally. Each of the nanocarbon light sources 10 has a ultrahigh-speed emission response, and it can be individually and rapidly controlled at a desired timing.

In one-dimensional or two-dimensional biochip analysis, various types of fixed probes 131 can be patterned in a desired layout. The distribution pattern of infrared absorption or infrared spectrum obtained by the spectroscopy represents a molecular structure or properties of the substance of the sample. By analyzing the one-dimensional or two-dimensional pattern obtained by the measurement, high efficiency identification or analysis is realized.

With currently available two-dimensional biochips using fluorescent markers, a fluorescent pattern acquired from the biochip has to be captured as an image by an image sensor or a two-dimensional array of photosensors. For a DNA chip, a fluorescent pattern reflecting the DNA sequence is photographed as a light image using an image sensor or a two-dimensional photosensor array.

In contrast, with the infrared analysis system 160 of the embodiment, the infrared light source itself is formed into a two-dimensional array using the nanocarbon light sources 10, and each of the nanocarbon light sources 10 is ON/OFF controlled independently from the other. By switching on the arrayed nanocarbon light sources 10 in turn, infrared analysis can be carried out using a single-channel spectroscope/photodetector 110. The configuration of the infrared analysis system 160 is simple, and the system can be constructed at low cost.

High-performance two-dimensional infrared detectors are not presently available, unlike visible range photodetectors, and currently available high-performance infrared detectors are generally single channel detectors. The approach of infrared analysis of the embodiment allows such a high-performance single channel photodetector to be incorporated in two-dimensional systems. By controlling the emission timings of the nanocarbon light sources 10, spectroscopy can be implemented easily. Biochip analysis using spectroscopy is also facilitated. Further, since the nanocarbon light source 10 can emit visible light, as well as infrared light, a biochip using a conventional phosphor or absorption of visible light can also be developed.

The biochip analysis of the fifth embodiment can be combined with any one of the configurations or schemes of the first to fourth embodiments.

Sixth Embodiment

Figure 20:
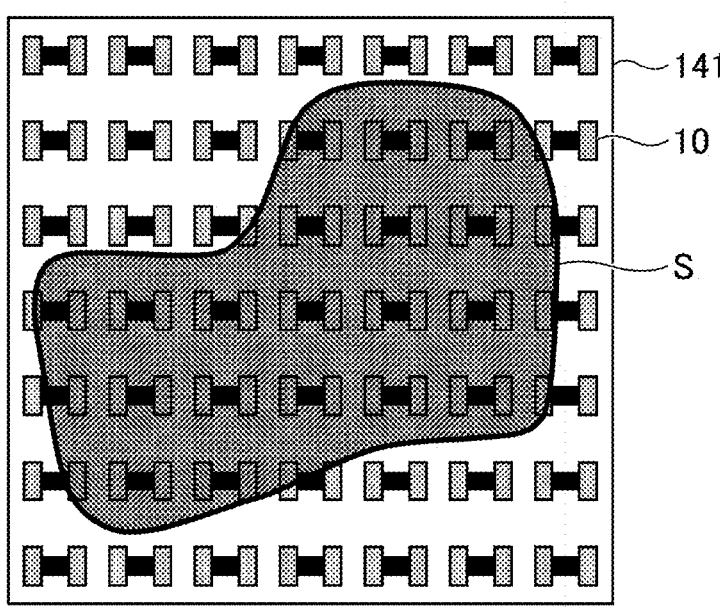
FIG. 20 illustrates an application of the infrared light source array to an imaging technique according to the sixth embodiment.

FIG. 20 illustrates an application to an imaging device according to the sixth embodiment. In the sixth embodiment, an array of fine infrared emitter elements such as the nanocarbon light sources 10 is applied to infrared imaging. The infrared imaging device has an infrared light source array 140 in which a plurality of infrared emitter elements are arranged, and a spectroscope/photodetector 110 (see FIG. 19, for example) positioned so as to face the infrared light source array 140. A sample can be placed directly on the surface of the infrared light source array 140.

The nanocarbon light source 10 may be used as the infrared emitter element. Unlike conventional infrared light sources such as halogen lamps, the nanocarbon light source 10 can be easily integrated in an array on various types of substrates including silicon, glass, semiconductors, insulators, and polymer substrates, and the emitter elements can be turned on independently from one another.

By placing the sample S onto the one-dimensional or two-dimensional infrared light source array 140, the sample can be imaged using a single spectroscope/photodetector 110. The sample S may be a biochemical sample, a biological sample, an organic substance, an inorganic substance, or any other substances.

In general, it is difficult for infrared detectors to build up a low noise and high sensitivity array detector, which is one of the reasons why practical application of infrared imaging has been limited. Since in the present invention the light emitter side can be formed into a fine array, in place of the detector side, it becomes possible to use a single device of high performance (namely, high sensitivity and high speed) infrared detector.

By synchronizing the emission timing of each of the light emitter elements arranged in, for example, the infrared light source array 140 and the detection timing of a single set of spectroscope/photodetector, the infrared absorbance or the infrared spectrum can be imaged quickly for each of the light source elements. A single detector is sufficient, and a desired wavelength can be selected in combination with a spectroscope or an optical filter. Spectral imaging for respective wavelengths can also be easily achieved.

The above-described infrared imaging is implemented making use of characteristics of the nanocarbon light source 10 such as a "high-speed light source" or a "minute light source", and such infrared imaging cannot be achieved by conventional infrared spectroscopy using a halogen lamp or a ceramic light source. This is a novel imaging technique. In place of the nanocarbon light source 10, semiconductor light emitting devices, organic light emitting device, or any type of miniaturized light emitting devices with high response may be used to implement infrared imaging.

Seventh Embodiment

Figure 21:
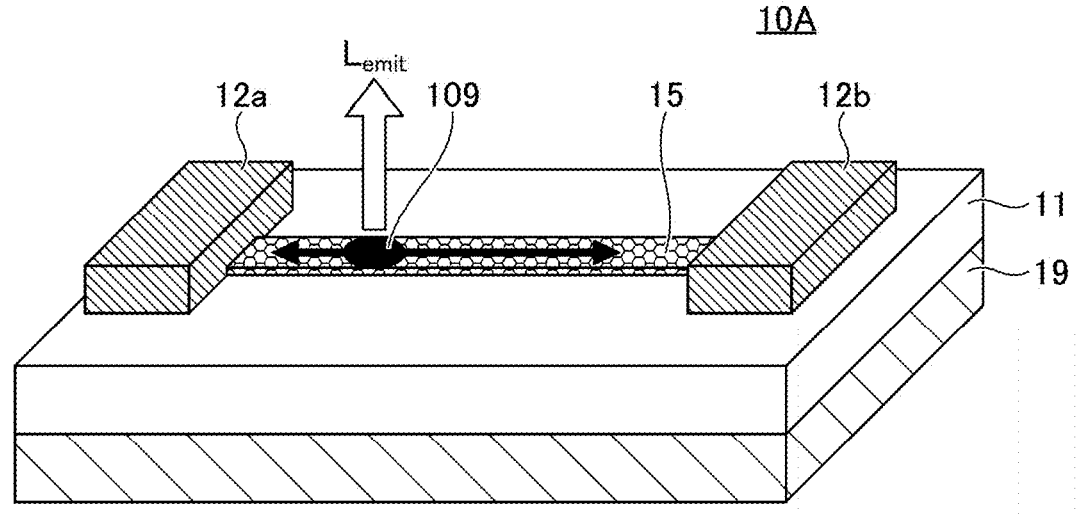
FIG. 21 is a schematic view of a nanocarbon light source 10A according to the seventh embodiment.

FIG. 21 is a schematic diagram of a nanocarbon light source 10A according to the seventh embodiment. The nanocarbon light source 10A includes a gate electrode 19, and a nanocarbon material 15 extending in a predetermined direction between a pair of electrodes 12a and 12b. The nanocarbon material 15 extending in the predetermined direction is, for example, a single-layer or multilayer graphene. Graphene may be directly grown on a substrate 11 by chemical vapor deposition (CVD) or other suitable methods, or alternatively, it may be formed by a transfer method or the like.

The gate electrode 19 may be a metal electrode; or a conductive substrate, such as a doped silicon substrate, may be used as the gate electrode. The gate electrode 19 may be formed of a transparent conductive material provided on the back surface (opposite to the top surface on which the nanocarbon material 15 is provided) of the substrate 11. The gate electrode 19 may be provided so as to cover a wide area of the back surface of the substrate 11, or it may be provided just under the graphene. The substrate 11 around the gate electrode 19 is preferably an insulator. An insulating substrate or a substrate with an insulating thin film such as a silicon oxide thin film may be used. By applying a voltage to the gate electrode 19, the carrier concentration in the nanocarbon material 15 can be spatially controlled, and for example, a hotspot 109 that emits bright light can be produced in an area where the carrier concentration is low. Light emission from the hotspot 109 is indicated by "$L_{emit}$" in the figure.

By changing the voltage level applied to the gate electrode 19, the position of the hotspot 109 can be varied along the length direction of the nanocarbon material 15. Thus, a nanocarbon light source 10A which is capable of sweeping the light emission in the length direction of the nanocarbon material 15 under the control of the gate voltage is achieved.

This configuration allows the nanocarbon light source 10A to have a spatial resolution in the one-dimensional direction. This light source can be used as a one-dimensional imaging light source.

Figure 22:
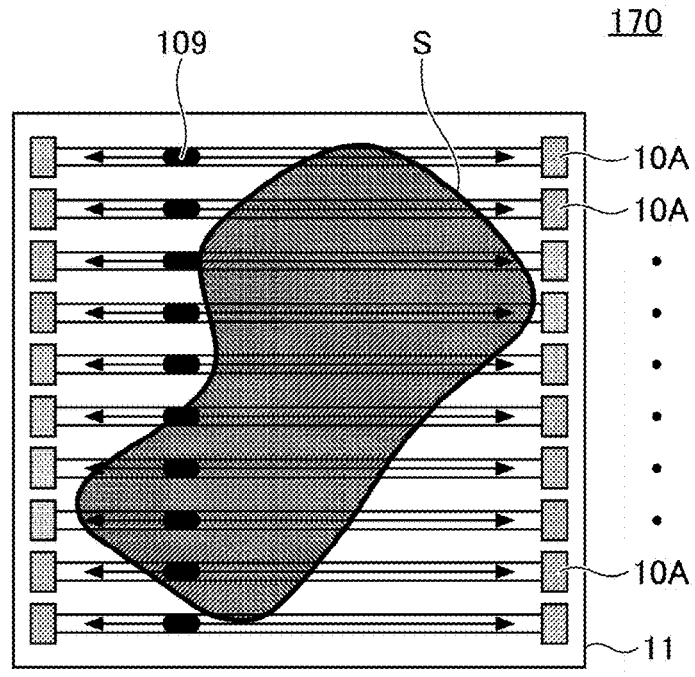
FIG. 22 illustrates an application of a light source array with nanocarbon light source devices of the seventh embodiment to an imaging technique.

FIG. 22 illustrate an infrared light source array 170 in which a plurality of nanocarbon light sources 10A of FIG. 21 are arranged in a direction orthogonal to the sweep direction.

By combining this infrared light source array 170 with a spectroscope/photodetector 110 and a gate voltage controller, a two-dimensional imaging device can be constructed.

A sample S may be mounted directly on the surface of the infrared light source array 170. A common gate electrode 19 may be formed on the back surface of the substrate 11, or multiple stripe gate electrodes 19 may be provided corresponding to the plurality of the nanocarbon light sources 10A. When the common gate electrode 19 is used, a pair of electrodes 12a and 12b is sequentially selected, and the gate voltage is changed for the selected nanocarbon light source 10A to sweep the hotspot 109 in the length direction of the nanocarbon material 15. When lines of gate electrodes 19 are used, the hotspots 109 can be simultaneously swept at the plurality of nanocarbon light sources 10A. In this case, ultrafast imaging is achieved.

With a single nanocarbon light source 10A, the length of the nanocarbon material 15 or the sweeping distance of the hotspot 109 may be occasionally limited. However, by arranging the nanocarbon light sources 10A so as to cover a two-dimensionally spread area, wide range and high-speed infrared imaging can be achieved.

Although in FIG. 22 the nanocarbon light sources 10A are arranged only in the vertical direction of the paper, a plurality of nanocarbon light sources 10 may be arranged in the horizontal direction of the paper. Vertically arranged nanocarbon light sources 10A and horizontally arranged nanocarbon light sources 10B may be stacked via an insulating layer between the layers to form a light source array of a two-dimensional matrix.

Figure 23:
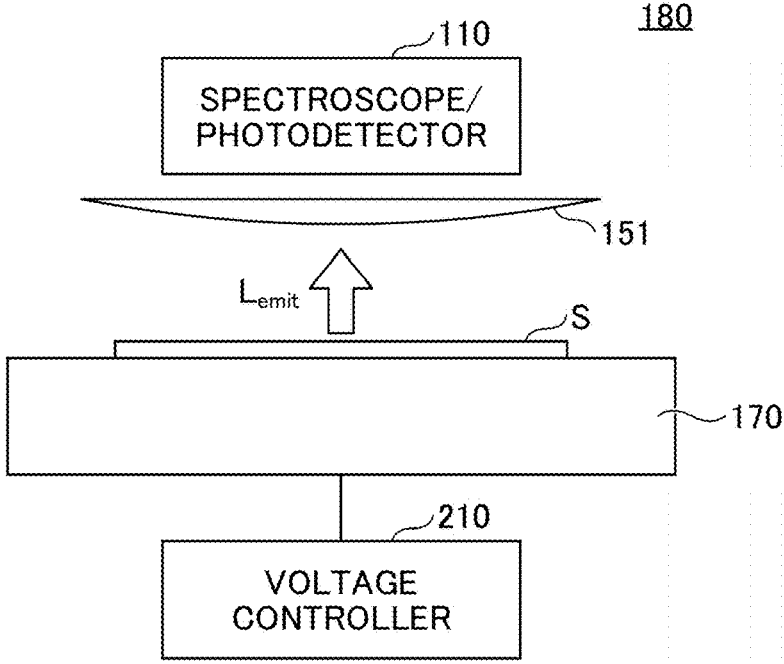
FIG. 23 is a schematic configuration diagram of an infrared analysis system using an imaging device of the seventh embodiment.

FIG. 23 is a schematic diagram of an imaging device 180 of the seventh embodiment. The imaging device 180 includes an infrared light source array 170, a voltage controller 210 that controls the voltage applied to the infrared light source array 170, and a spectroscope/photodetector 110 for detecting infrared light ($L_{emit}$) transmitted through the sample S.

A condenser lens 151 may be provided between the infrared light source array 170 and the spectroscope/photodetector 110. An information processor 103 (see FIG. 10) having a display device may be connected to the output of the spectroscope/photodetector 110.

The voltage controller 210 controls the voltage level applied to the gate electrode 19. Alternatively, a plurality of arrayed nanocarbon light sources 10A may be sequentially selected, and the voltage applied between the pair of electrodes 12a and 12b may be turned on or off at the respective nanocarbon light sources under the control of the voltage controller 210.

By storing the output result of the spectroscope/photodetector 110 for each sweep of a nanocarbon light source 10A in the infrared light source array 170 in the information processor 103 or in an external memory device, a line of sample information (such as infrared absorbance, spectrum change, etc.) is acquired. The two-dimensional distribution of internal information of the sample S can be obtained by sweeping hotspots for all the nanocarbon light sources 10A.

Advantageous Effects of the Embodiment

The infrared analysis of the present invention uses a minute infrared light source such as the nanocarbon light source 10. When carbon nanotubes are used as the luminescent material, the size of the light source element can be reduced to 1 nm square, and using graphene, the size can be reduced to 100 nm square. In comparison, laser sources used in conventional scanning near field optical microscopes (SNOMs) have a size of about 10 cm square at the minimum, and likewise, conventional halogen lamps or ceramic light sources used in FT-IR have a size of about 1 cm square.

In the present invention, a minute infrared light source which can be easily integrated or arrayed on a chip is used. Such integration or chip configuration cannot be achieved by a conventional light source generally used in FT-IR or SNOM. The present invention achieves ultrafast imaging based on high sensitivity using high-speed modulation, microanalysis chip configuration, or two-dimensional array configuration. Any one of these characteristics cannot be achieve by conventional SNOM or FT-IR.

Concerning the wavelength range, the infrared analysis of the present invention is applicable over a wide wavelength range of 1 μm to 10 μm. Although FT-IR is performed the same wavelength range, SNOM is limited to a single wavelength or a narrow wavelength band determined by the laser.

Concerning the spatial resolution, the infrared analysis of the present invention achieves high spatial resolution of 1 nm to 100 nm. The spatial resolution of SNOM is as high as 10 nm, but FT-IR spatial resolution is about 10 μm.

Concerning the time resolution, infrared analysis of the present invention achieves as fast speed as 100 ps time resolution. The time resolution of typical FT-IR is as slow as 100 ms. For SNOM, time-resolved measurements are difficult.

Hence, infrared analysis of the present invention has high spatial resolution and time-resolution using a minute light source, and advantageous feature including integration, improved sensitivity by high-frequency modulation, formation of a microanalysis chip, and high-speed imaging can be achieved.

OTHER MODIFICATIONS

Although configurations and schemes of the present invention have been described above based on the specific embodiments, the present invention is not limited to the specific examples described above. Any of the first to seventh embodiments may be combined with each other. For example, the biochip 130 and/or biochip 150 of the fifth embodiment may be applied to the infrared imaging of the sixth embodiment because both the biochip and the infrared imaging are implemented as long as a two-dimensional infrared light source array is available. Although the nanocarbon light source of the embodiment is a suitable element for the two-dimensional infrared light source array, any kind of minute infrared light source may be used as long as such infrared light source elements are integrated in an array.

At present, a biochip such as a DNA chip using visible light and a fluorescent marker has been put into practical use. However, an expensive fluorescent marker and a camera or a two-dimensional image sensor are used, and the cost of such spectroscopy is high. A two-dimensional LED array of the fifth or the sixth embodiment is suitably used, instead of using fluorescent makers, to perform biochip analysis such as DNA analysis using a single-channel photodetector, without using a two-dimensional image sensor array, by sequentially switching emission points of the light emitting devices. By sweeping the hotspots as in the seventh embodiment, a single infrared light source can have a spatial resolution in one-dimensional direction. When a plurality of infrared light sources, each being capable of hotspot sweeping, are arranged in a direction orthogonal to the sweeping direction, wide range imaging can be performed.

By controlling the light emission timing or the sweep timing of the respective light emitting devices, spectroscopy and biochip analysis can be combined. For example, in two-dimensional DNA pattern analysis, more sophisticated analysis can be performed on a DNA expression pattern by adding a degree of freedom using spectroscopy, and more detailed DNA analysis information can be acquired.

The biochip analysis and infrared light source array of the embodiments may be combined with phosphor-based conventional analysis. In this case, analysis of fluorescent markers using light beams emitted from the two-dimensionally arranged light emitter elements, or biochip analysis based on light absorption with respect to the visible light can be implemented.

When the nanocarbon light sources 10 or 10A of the embodiment are used as the light emitter elements arranged in a two-dimensional array, biochip analysis (such as a DNA analysis) can be performed based on infrared absorption pattern due to molecular vibration or the like, instead of photographing and analyzing a two-dimensional fluorescence pattern image from the fluorescent markers. Bioanalysis on a sample becomes possible without requiring fluorescent markers. Bioanalysis can be performed based on infrared absorption occurring in a sample that does not itself exhibit fluorescence or in a molecule that modifies the sample, and an inexpensive biochip or DNA analysis can be realized.

Although not explicitly illustrated in the figure, an information processor 103 (see FIG. 10) that carries out signal processing or image processing on the signals acquired from the spectroscope/photodetector 110 may be used in the infrared analysis of the fourth and fifth embodiments. The output of a single detector used in the infrared imaging of the sixth embodiment may be connected to the input of the information processor 103. In either case, high speed and high sensitivity infrared analysis is achieved.

REFERENCE TO SYMBOLS 10, 10A: nanocarbon light source
11, 11A, 121, 141: substrate
12*a*, 12*b*: electrodes
15: nanocarbon material
16: Protective film
20: Probe type light source
22: stage
100, 100A-100C, 160: infrared analysis system
102: near-field light
103: information processor
105: excitation source
106: optical filter
107: microchannel
108, 120: Microanalysis chip (an example of infrared analysis chip)
110, 110-1, 110-2: Spectroscope/photodetector (detection means)
123: microchannel/reactor
130, 150: biochip (an example of infrared analysis chip)
131: fixed probe 140, 140A, 170: infrared light source array
180: Imaging device
S: sample

What is claimed is:

1. An infrared imaging device comprising:
a light source substrate on which a plurality of light emitting devices are arranged in an array, each of the plurality of light emitting devices being configured to emit infrared light; and
a single infrared detector provided facing the light source substrate,
wherein a surface of the light source substrate is configured to receive a sample,
wherein operation of the infrared detector is synchronized with a light emission timing of the plurality of the light emitting devices,
wherein the single infrared detector is configured to detect the infrared light emitted from at least two of light sources among the plurality of light emitting devices, and
wherein the single infrared detector is configured to detect the infrared light that is emitted from the at least two of light sources directly to the sample, and transmitted through the sample.

2. The infrared imaging device as claimed in claim 1, wherein each of the plurality of light emitting devices is formed of a nanocarbon material and configured to be turned on independently from one another.

3. The infrared imaging device as claimed in claim 1, wherein the single infrared detector is configured to detect the infrared light emitted from the at least two of light sources transmitted through the sample.

4. The infrared imaging device as claimed in claim 1, wherein the plurality of light emitting devices are configured to emit in a direction intersecting the surface of the light source substrate.

5. The infrared imaging device as claimed in claim 1, wherein the plurality of light emitting devices are arranged in two-dimensional array.

6. The infrared imaging device as claimed in claim 1, further comprising a plurality of probe substances fixed between the at least two of light sources and the single infrared detector and each of the plurality of the probe substances is selectively bound to a specific target substance.

7. The infrared imaging device as claimed in claim 6, wherein the plurality of the probe substances includes multiple types of probe substances.

8. The infrared imaging device as claimed in claim 2, wherein each of the plurality of light emitting devices is configured to be sequentially turned on.

9. The infrared imaging device as claimed in claim 1, wherein the single infrared detector is configured to detect the infrared light that is emitted in a direction intersecting the light source substrate from the at least two of light sources directly to the sample, and transmitted through the sample.

* * * * *